(12) United States Patent
Dwiggins et al.

(10) Patent No.: US 6,827,819 B2
(45) Date of Patent: Dec. 7, 2004

(54) SOFT BULKY MULTI-PLY PRODUCT

(75) Inventors: John H. Dwiggins, Neenah, WI (US); Frank D. Harper, Neenah, WI (US); Galyn A. Schulz, Greenville, WI (US); Pamela J. Wiese, Green Bay, WI (US); Joseph C. Leege, Neenah, WI (US); T. Philips Oriaran, Appleton, WI (US); Brian J. Schuh, Appleton, WI (US); Michael S. Heath, Menasha, WI (US); Greg A. Wendt, Neenah, WI (US)

(73) Assignee: Fort James Corporation, Atlanta, GA (US)

( * ) Notice: Subject to any disclaimer, the term of this patent is extended or adjusted under 35 U.S.C. 154(b) by 0 days.

(21) Appl. No.: 10/793,456

(22) Filed: Mar. 3, 2004

(65) Prior Publication Data

US 2004/0168780 A1 Sep. 2, 2004

Related U.S. Application Data

(62) Division of application No. 10/112,376, filed on Mar. 28, 2002.
(60) Provisional application No. 60/286,887, filed on Apr. 27, 2001.

(51) Int. Cl.[7] ........................ D21H 27/40; D21H 27/30; D21F 11/04; D21F 11/14; B32B 29/00
(52) U.S. Cl. ........................ 162/123; 162/117; 162/158; 162/204; 162/132; 162/164.6; 162/113; 162/179; 428/156; 428/172
(58) Field of Search ........................ 162/109, 111–113, 162/117, 123, 132, 16, 4, 164.6, 147, 168.1, 179, 168.3, 204–207; 156/205, 209, 292, 324, 553, 582; 428/153–154, 156, 166, 172, 178, 180, 184, 188, 198

(56) References Cited

U.S. PATENT DOCUMENTS

| | | |
|---|---|---|
| 3,650,882 A | 3/1972 | Thomas |
| 3,953,638 A | 4/1976 | Kemp |
| 3,961,119 A | 6/1976 | Thomas |
| 4,284,465 A | 8/1981 | Walbrun |
| 4,307,141 A | 12/1981 | Walbrun |
| 4,320,162 A | 3/1982 | Schulz |
| 4,325,768 A | 4/1982 | Schulz |
| 4,325,773 A | 4/1982 | Schulz |
| 4,326,002 A | 4/1982 | Schulz |
| 4,376,671 A | 3/1983 | Schulz |
| 4,483,728 A | 11/1984 | Bauernfeind |
| 5,093,068 A | 3/1992 | Schulz |
| 5,320,710 A | 6/1994 | Reeves |

(List continued on next page.)

FOREIGN PATENT DOCUMENTS

| | | |
|---|---|---|
| EP | 0495637 A1 | 7/1992 |
| EP | 1096069 A2 | 5/2001 |

(List continued on next page.)

Primary Examiner—José A. Fortruna

(57) ABSTRACT

An ultra soft, bulky, multi-ply tissue having low overall sidedness and a geometric mean tensile strength of less than about 800 g/3" wherein an embossed ply has a TMI sidedness of at least about 0.45 and an embossed area of at least about 2%, which is capable of being made from non-premium furnish, and method for making such products are disclosed. An ultra soft, bulky, multi-ply tissue having low overall sidedness and a geometric mean tensile strength of less than about 35 g/3" per lb. of basis weight wherein an embossed ply has a TMI sidedness of at least about 0.45 and an embossed area of at least about 2%, which is capable of being made from non-premium furnish, and method for making such products are also disclosed.

36 Claims, 22 Drawing Sheets

U.S. PATENT DOCUMENTS

| | | | |
|---|---|---|---|
| 5,382,464 A | | 1/1995 | Ruppel et al. |
| 5,562,805 A | * | 10/1996 | Kamps et al. ............... 162/117 |
| 5,695,607 A | * | 12/1997 | Oriaran et al. ............... 162/112 |
| 5,702,571 A | | 12/1997 | Kamps |
| 5,840,404 A | | 11/1998 | Graff |
| 5,851,629 A | * | 12/1998 | Oriaran et al. ............... 428/153 |
| 5,882,479 A | * | 3/1999 | Oriaran et al. ............... 162/112 |
| 5,919,556 A | | 7/1999 | Barnholtz |
| 6,033,523 A | | 3/2000 | Dwiggins |
| 6,033,761 A | * | 3/2000 | Dwiggins et al. ........... 428/172 |
| 6,051,104 A | * | 4/2000 | Oriaran et al. ............... 162/112 |
| 6,068,731 A | * | 5/2000 | Dwiggins et al. ........... 162/109 |
| 6,113,723 A | | 9/2000 | McNeil et al. |
| 6,113,740 A | * | 9/2000 | Oriaran et al. ............... 162/112 |
| 6,129,972 A | | 10/2000 | McNeil et al. |
| 6,143,131 A | * | 11/2000 | Dwiggins et al. ........... 162/109 |
| 6,153,053 A | * | 11/2000 | Harper et al. ................ 162/109 |
| 6,334,931 B1 | * | 1/2002 | Dwiggins et al. ........... 162/109 |
| 6,365,000 B1 | * | 4/2002 | Dwiggins et al. ........... 162/111 |
| 6,368,454 B1 | * | 4/2002 | Dwiggins et al. ........... 162/117 |
| 6,517,673 B1 | * | 2/2003 | Heath et al. ................. 162/117 |
| 6,558,511 B2 | * | 5/2003 | Dwiggins et al. ........... 162/112 |
| 2001/0042606 A1 | * | 11/2001 | Harper et al. ................ 162/111 |
| 2002/0104630 A1 | * | 8/2002 | Dwiggins et al. ........... 162/123 |
| 2003/0102096 A1 | * | 6/2003 | Dwiggins et al. ........... 162/123 |

FOREIGN PATENT DOCUMENTS

| | | | |
|---|---|---|---|
| EP | 904456 B1 * | 7/2001 | ............ A47K/7/00 |
| EP | 1253242 A2 * | 10/2002 | .......... D21H/27/40 |
| WO | WO 9844194 A1 * | 10/1998 | ............ D21F/11/14 |
| WO | WO 9914035 A1 * | 3/1999 | ............ B31F/1/07 |
| WO | WO 0147699 A1 | 7/2001 | |
| WO | WO 0214606 A2 | 2/2002 | |

* cited by examiner

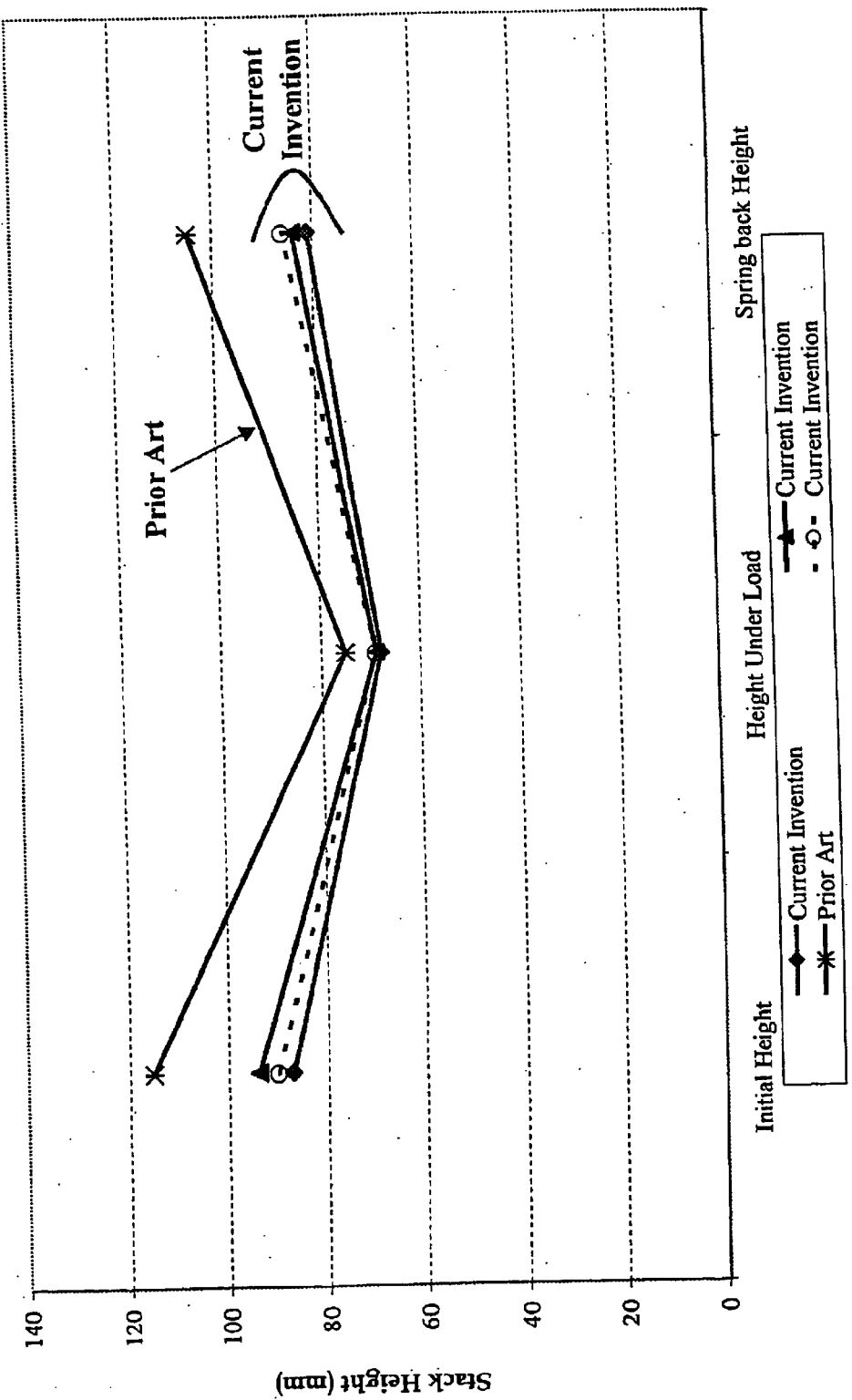

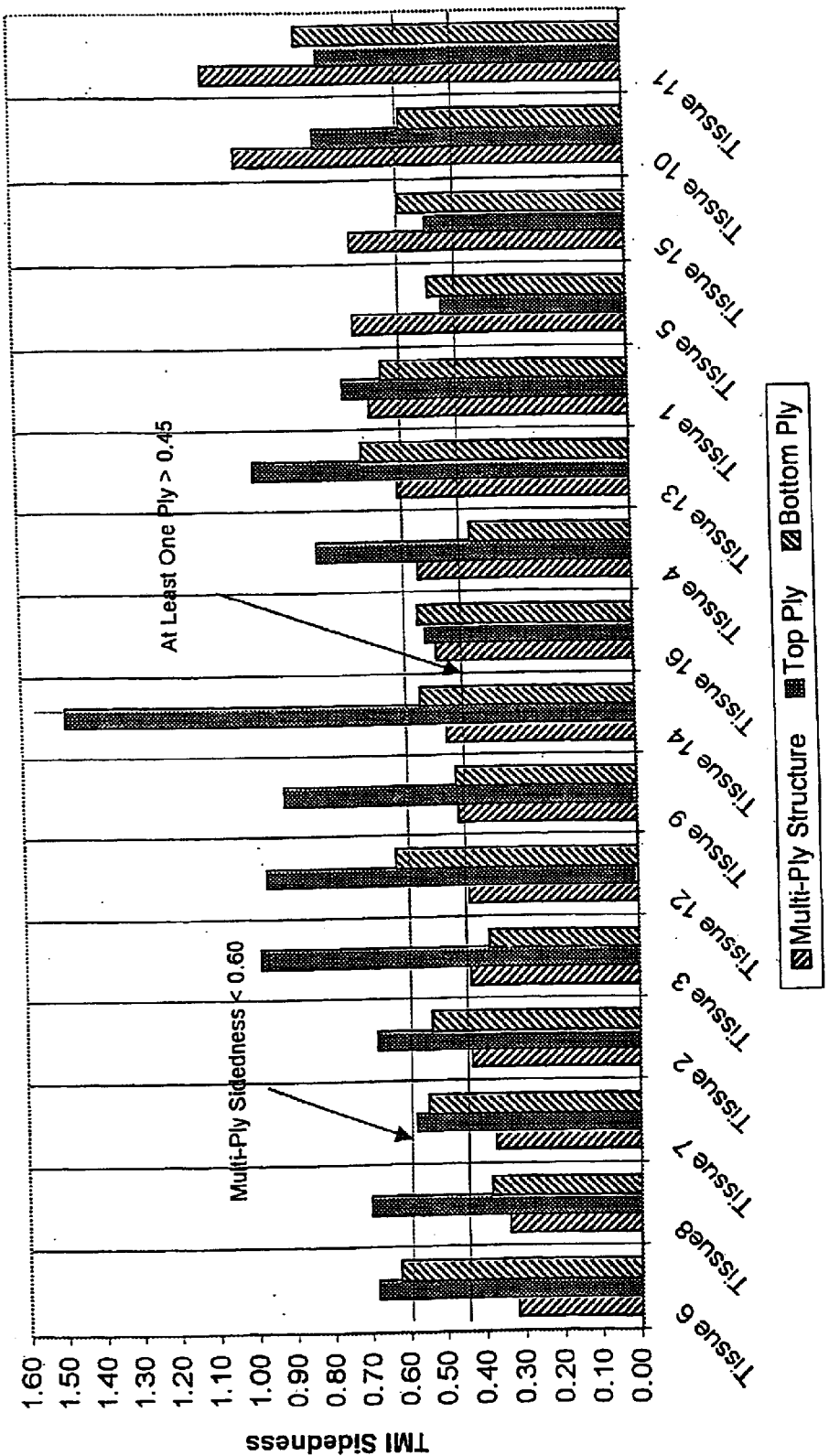
FIGURE 21: TMI Sidedness for Multi-Ply, Bottom Ply, and Top Ply

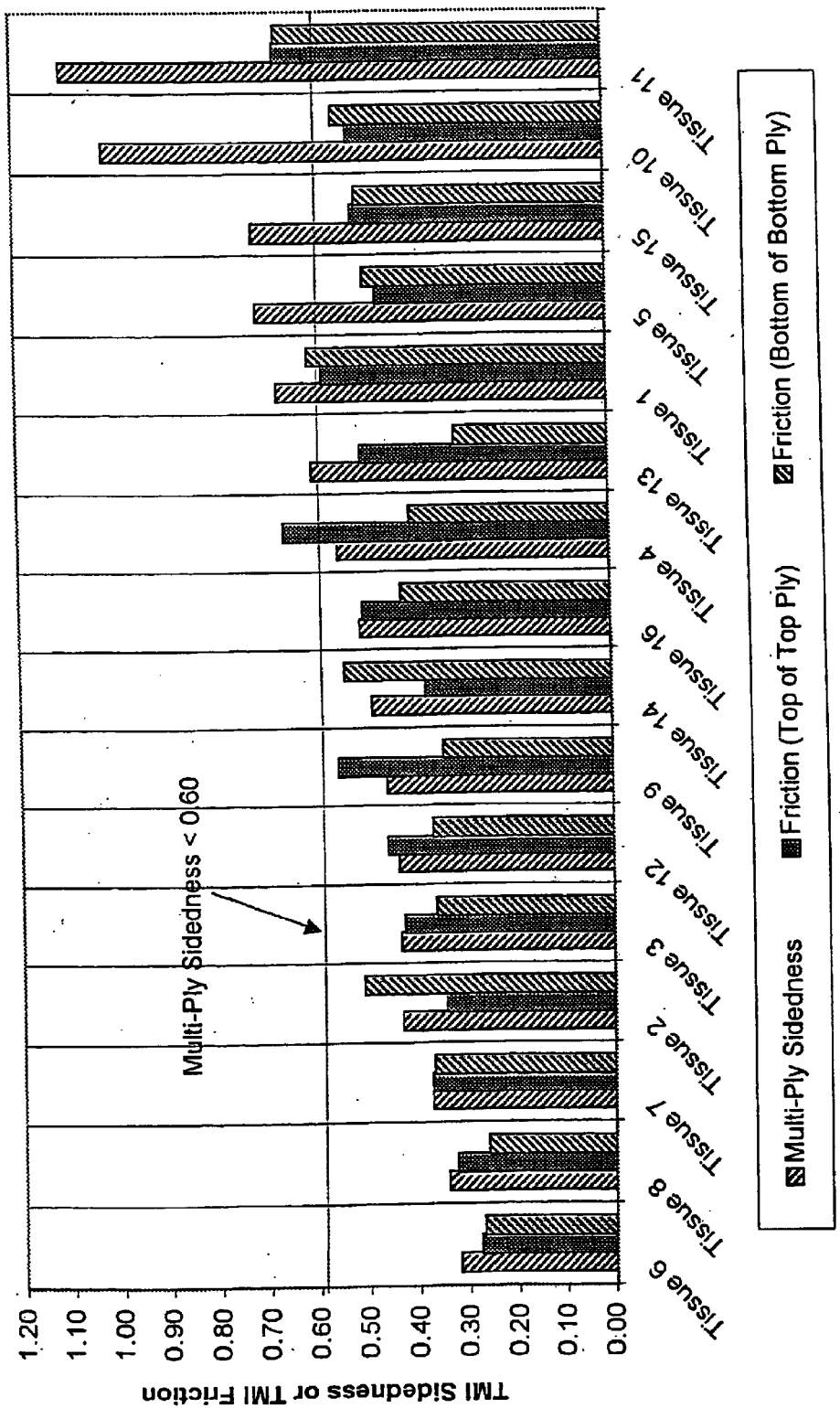

SOFT BULKY MULTI-PLY PRODUCT

CROSS REFERENCE TO RELATED APPLICATION

This application is a division of application Ser. No. 10/112,376, filed Mar. 28, 2002, which claims the benefit of provisional application No. 60/286,887, filed Apr. 27, 2001, both of which are incorporated herein by reference.

BACKGROUND OF THE INVENTION

In the area of bathroom tissue, softness, absorbency and strength are key attributes considered by consumers. It is highly desirable that the tissue product have a consumer perceived feel of softness. This softness plays a key role in consumer preference. Softness relates both to the product bulk and surface characteristics. In addition to softness, the consumer desires a product that is both strong and absorbent to minimize the amount of the product which must be used to do an effective job.

In a conventional wet press ("CWP") process and apparatus 10, as exemplified in FIG. 1, a furnish is fed from a silo 50 through conduits 40, 41 to headbox chambers 20, 20'. A web (W) is formed on a conventional wire former 12, supported by rolls 18, 19 from a liquid slurry of pulp, water and other chemicals. Materials removed from the web of fabric in the forming zone when pressed against a forming roll 15 are returned to the silo 50 from a saveall 22 through a conduit 24. The web is then transferred to a moving felt or fabric 14, supported by a roll 11 for drying and pressing. Materials removed from the web during drying and pressing or from a Uhle box 29 are collected in a saveall 44 and fed to a white water conduit 45. The web is then pressed by a suction press roll 16 against the surface of a rotating Yankee dryer cylinder 26 which is heated to cause the paper to substantially dry on the cylinder surface. The moisture within the web as it is laid on the Yankee surface causes the web to transfer to the surface. Liquid adhesive may be applied to the surface of the dryer to provide substantial adherence of the web to the creping surface. The web is then creped from the surface with a creping blade 27. The creped web is then usually passed between calender rollers 30 and rolled up on a roll 28 prior to further converting operations, for example, embossing. The action of the creping blade on the paper is known to cause a portion of the interfiber bonds within the paper to be broken up by the mechanical smashing action of the blade against the web as it is being driven into the blade. However, fairly strong interfiber bonds are formed between the wood pulp fibers during the drying of the moisture from the web. The strength of these bonds in prior art tissues is such that, even after creping, the web typically retains a perceived feeling of hardness, a fairly high density, and low-bulk and water absorbency.

To reduce the strength of the interfiber bonds that inevitably result when wet pressing and drying a web from a slurry, various processes have been utilized. One such process is the passing of heated air through the wet fibrous web after it is formed on a wire and transferred to a permeable carrier—a so-called through-air-drying ("TAD") process—so that the web is not compacted prior to being dried. The lack of compaction, such as would occur when the web is pressed while on a felt or fabric and against the drying cylinder when it is transferred thereto, reduces the opportunity for interfiber bonding to occur, and allows the finished product to have greater bulk than can be achieved in a wet press process. Because of the consumer perceived softness of these products, and their greater ability to absorb liquids than webs formed in wet press processes, the products formed by the newer TAD processes enjoy an advantage in consumer acceptance.

Felted wet press processes, however, are significantly more energy efficient than processes such as through-air-drying since they do not require heating and moving large quantities of air as required by the TAD process. In wet press operations, excess moisture is mechanically pressed from the web and the final drying of the web is obtained chiefly on the heated Yankee drying cylinder which is maintained at the proper drying temperature.

A conventional TAD process is illustrated in FIG. 2. In the process, a wet sheet 71 that has been formed on a forming fabric 61 is transferred to a through-air-drying fabric 62, usually by a vacuum device 63. TAD fabric 62 is usually a coarsely woven fabric that allows relatively free passage of air through both the fabric 62 and nascent web 71. While on the fabric 62, the sheet 71 is dried by blowing hot air through the sheet 71 using a through-air-dryer 64. This operation reduces the sheet moisture to a value usually between 10 and 65 percent. The partially dried sheet 71 is then transferred to a Yankee dryer 30 where it is dried to its final desired moisture content and is subsequently creped off the Yankee.

In a conventional embossing process according to the prior art as shown in FIG. 3, cellulosic webs 11 and 12 are supplied from parent rolls 21 and 22. The webs are joined together at or prior to the emboss nip which is formed by an emboss roll 31 and a backing roll 41. The emboss roll 31 has raised protrusions (not shown) on the surface of the roll that make up the emboss pattern. This pattern is transferred to the combined webs by pressing them between the emboss roll 31 and the backing roll 41, which is usually made of rubber or other like material that allows the pattern on the emboss roll 31 to be impressed into the combined web 13. The combined web 13 may be further processed by perfing and/or calendering (not shown) before it is wound onto a finished roll 51.

Thus, the art lacks a method for making a CWP tissue product that achieves high strength, bulk, absorbency, and softness above existing conventional wet pressed tissue, approaching or achieving levels even beyond those found using through-air-drying. The art further lacks a method for making a TAD product that achieves high strength, bulk, absorbency, and softness above existing TAD tissue.

These and other drawbacks of the prior art are overcome by the method of the present invention which can use wet press technology to prepare a strong, ultra soft, bulky tissue. The tissue produced by the method of the present invention exhibits good strength and absorbency while remaining extremely soft. Properties such as those exhibited by the CWP tissue of the present invention have not heretofore been seen in wet press tissue products. The present invention provides a method for making a CWP tissue product that achieves high strength, bulk, absorbency, and softness above existing conventional wet pressed tissue, approaching or achieving levels even beyond those found using through-air-drying. The process according to the present invention is capable of using the cheaper more efficient wet press process and optionally can use less expensive, non-premium fibers. The method of the present invention can also be used to prepare multi-ply tissue products from TAD basesheets. The present invention can be used to make a TAD product that achieves high strength, bulk, absorbency, and softness above existing TAD tissue.

FIELD OF THE INVENTION

The present invention is directed to a method of making an improved ultra soft, bulky, multi-ply product. More particularly, the present invention is directed to a method of making an ultra soft, bulky, multi-ply tissue which can be made from a variety of different furnishes. Still further, the present invention is directed to improving the bulk density and resiliency of a multi-ply product. The present invention is further directed to an ultra soft bathroom tissue.

SUMMARY OF THE INVENTION

Further advantages of the invention will be set forth in part in the description which follows. The advantages of the invention may be realized and attained by virtue of the instrumentalities and combinations particularly pointed out in the appended claims.

To achieve the foregoing advantages and in accordance with the purpose of the invention as embodied and broadly described herein, there is provided a multi-ply tissue product formed by marrying a first embossed ply with a second ply, the first embossed ply having a TMI sidedness of at least about 0.45 and an embossed area of at least about 2%, preferably more than 4%, more preferably greater than 8%, wherein the multi-ply tissue product exhibits an overall TMI sidedness of less than about 0.6 and a geometric mean tensile strength of less than about 800 g/3".

In accordance with another aspect of the present invention there is provided multi-ply tissue product formed by marrying a first embossed ply with a second ply, the first embossed ply having a TMI sidedness of at least about 0.45 and an embossed area of at least about 2%, preferably more than 4%, more preferably greater than 8%, wherein the multi-ply tissue product exhibits an overall TMI sidedness of less than about 0.6 and a geometric mean tensile strength of less than about 35 g/3' per lb. of basis weight.

In accordance with another aspect of the present invention, there is provided a method for making an ultra soft high basis weight multi-ply tissue product including:

(a) providing a fibrous pulp furnish;
(b) forming a first nascent web from the furnish;
(c) forming a second nascent web from the furnish;
(d) embossing at least one of the webs between a pair of emboss rolls;
(e) combining the first web with the second web to form a multi-ply web;
(f) optionally calendering the embossed multi-ply web; and wherein steps (a)–(f) are controlled to produce a multi-ply tissue product, the first embossed ply having a TMI sidedness of at least about 0.45 and an embossed area of at least about 2%, preferably more than 4%, more preferably greater than 8%, wherein the multi-ply tissue product exhibits an overall TMI sidedness of less than about 0.6 and a geometric mean tensile strength of less than about 800 g/3".

In accordance with another aspect of the present invention, there is provided a method for making an ultra soft high basis weight multi-ply tissue product including:

(a) providing a fibrous pulp furnish;
(b) forming a first nascent web from the furnish;
(c) forming a second nascent web from the furnish;
(d) embossing at least one of the webs between a pair of emboss rolls;
(e) combining the first web with the second web to form a multi-ply web;
(f) optionally calendering the embossed multi-ply web; and wherein steps (a)–(f) are controlled to produce a multi-ply tissue product, the first embossed ply having a TMI sidedness of at least about 0.45 and an embossed area of at least about 2%, preferably more than 4%, more preferably greater than 8%, wherein the multi-ply tissue product exhibits an overall TMI sidedness of less than about 0.6 and a geometric mean tensile strength of less than about 35 g/3' per lb. of basis weight.

BRIEF DESCRIPTION OF THE DRAWINGS

FIG. 20 is a graph showing the spring back height of tissue according to the present invention compared to that of prior art tissue.

FIG. 21 is a graph showing the TMI sidedness for multi-ply, bottom ply, and top ply of tissues of the present invention compared to that of the prior art.

FIG. 22 is a graph showing the multi-ply TMI sidedness and TMI friction of outer surfaces of tissues of the present invention compared to that of the prior art.

DETAILED DESCRIPTION

Figure 1:
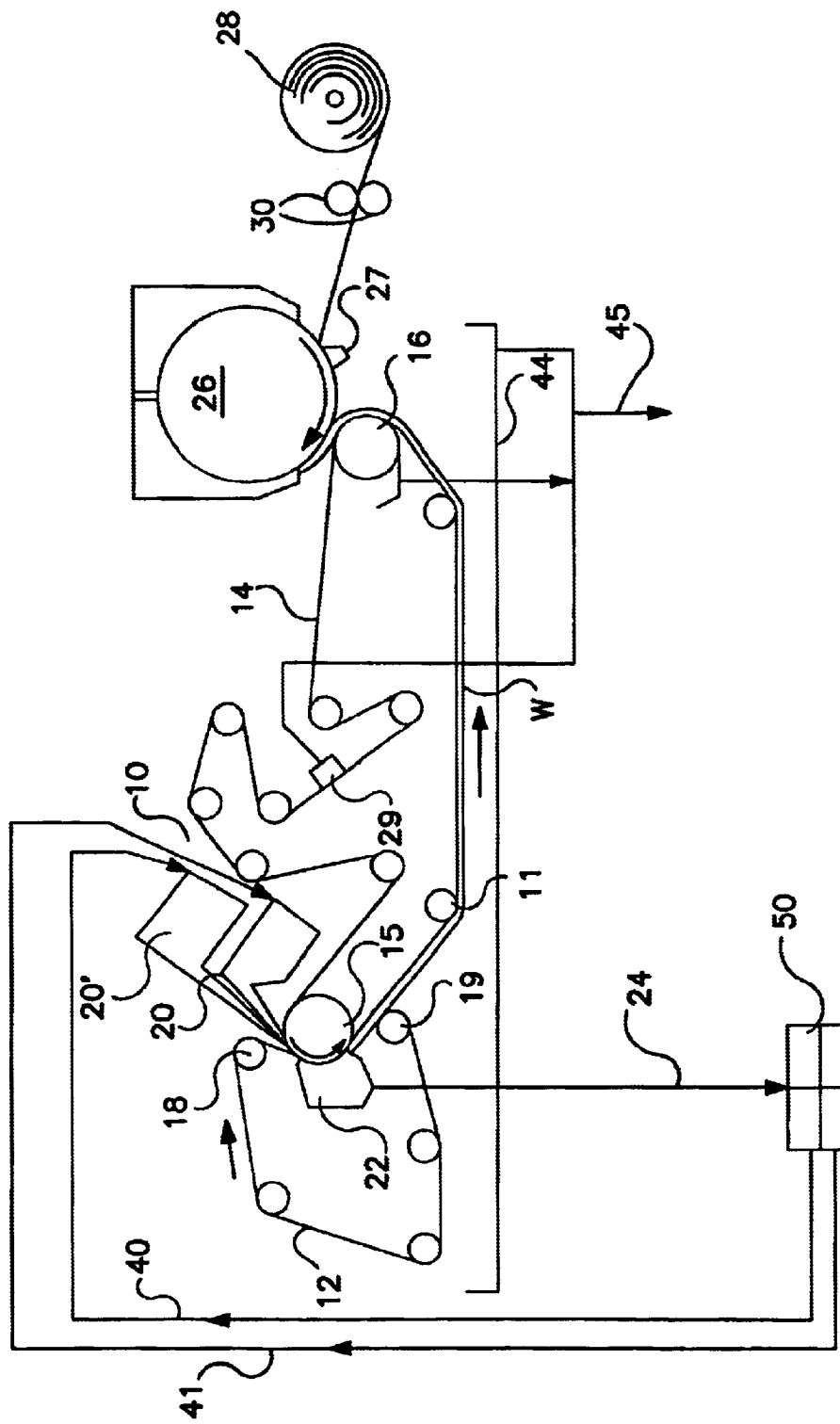
FIG. 1 is a schematic drawing of a conventional wet press processing apparatus for use in the present invention.
Figure 2:
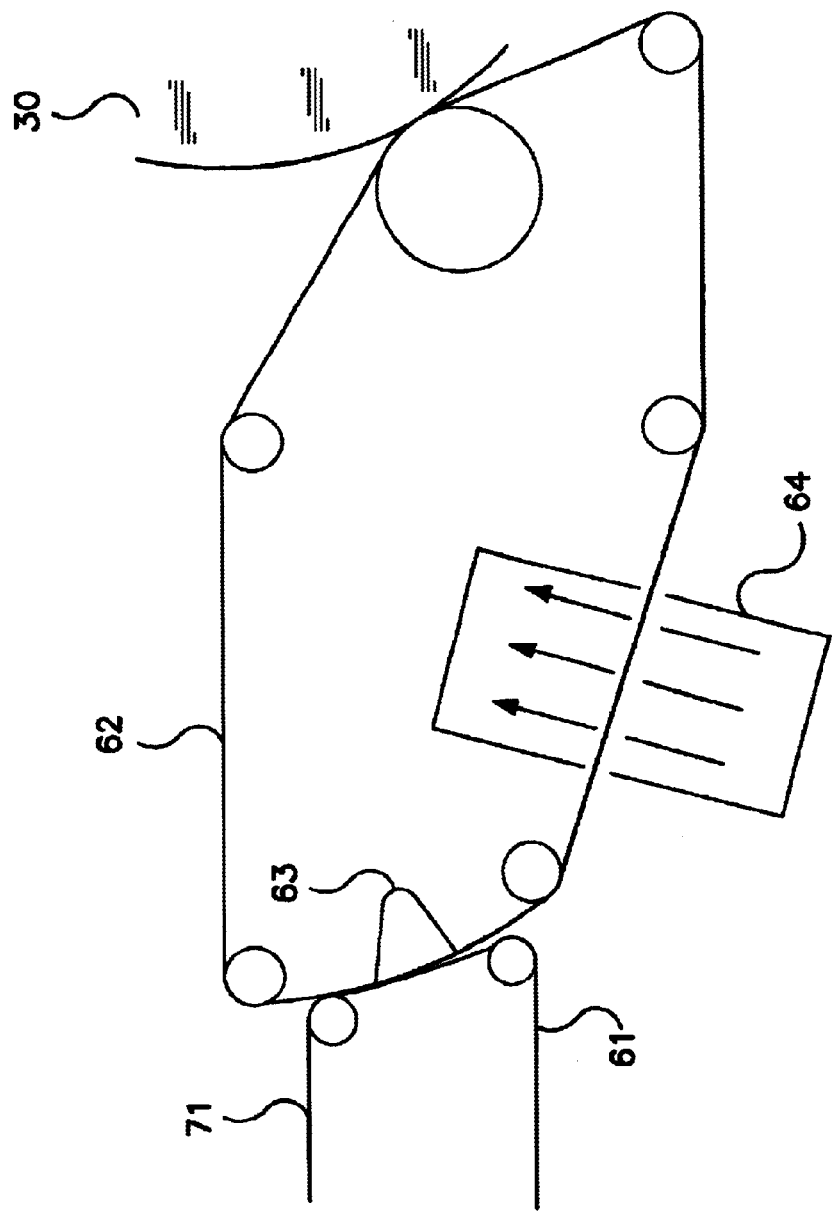
FIG. 2 is a schematic drawing of a conventional TAD processing apparatus for use in the present invention.

The present invention relates to the production of an ultra-soft, bulky, embossed, multi-ply tissue typically having a basis weight of about 18 or more lbs. per 3000 sq. ft. (ream). As used herein, ultra-soft products are those having low values of tensile stiffness, friction deviation, or (usually) both. Ultra-soft products generally have tensile stiffness of values of about 1.5 gram/inch/% strain per pound of basis weight or less, preferably about 1.0 gram/inch/% strain per pound of basis weight or less. The friction deviation of ultra-soft products is usually no more than about 0.6, preferably about 0.55 or less. As used in the specification and claims, the terms "friction" and "friction deviation" should be considered synonymous unless indicated to the contrary.

The present invention described herein in the context of CWP technology is illustrative only and it is understood that such examples are not meant to limit the invention. Furthermore, various changes and modifications that may become apparent to those skilled in the art from this detailed description are to be considered within the purview of the spirit and scope of the invention.

In particular what is especially intriguing about one embodiment of the present technology is that it enables the manufacture of a premium quality softness tissue with high bulk and high resiliency from a furnish which is of far less than premium quality. High coarseness furnishes can be used, such as those having a coarseness in excess of about 11 grams per hundred meters, or recycled furnishes containing high proportions of fines, ash, or even nonchemical pulps. Accordingly, the ability to utilize a low grade of the starting furnish is considered to be an important aspect of this embodiment of the present invention.

In one embodiment of the present invention, an embossing process is used in achieving novel results, wherein the following aspects are especially important: (i) the embossing pattern chosen produces protuberances predominantly on the harsher side of the sheet, preferably almost exclusively or exclusively on the harsher side of the sheet (usually the air side of the sheet, unless creping is performed with a biaxially undulatory type blade—then the Yankee side is typically the harsher side); and (ii) the pattern exhibits coverage of less than about 30%, preferably, less than about 20%, and more preferably between about 2% to about 15%. The term "coverage" is defined as being the percentage of the total area of the sheet which is deflected from the base planar of the sheet by more than 0.002'. In the most preferred embodiments, the pattern will be a micro/macro pattern having such coverage on the sheet. When the embossed plies are combined to form the multi-ply product, the protuberances should be disposed to the interior of the finished multi-ply product. Creping can also be performed with a biaxially undulatory type blade on the unembossed sheet. In such case, the side of the sheet having the resultant undulations or ridges (the Yankee side) is disposed in the interior of the finished multi-ply product.

The present invention in one embodiment provides a novel multi-ply tissue having desired high caliper by heavily embossing one sheet without necessarily obtaining a large difference in the sidedness of the multi-ply tissue.

In certain applications, the addition of at least about 1 lb. per 3000 square foot ream of a cationic nitrogenous debonder in each ply of the multi-ply product, is preferred. In certain applications, a temporary wet strength agent in an amount sufficient to bring the wet/dry ratio to at least about 10 to about 15 percent, is preferably added. The resulting finished product preferably has a machine direction tensile strength of from about 21 to about 35 grams/3 in. width per pound of basis weight and a caliper of at least about 2 mils/8 plies/pound basis weight.

Until now, ultra-soft products have been made primarily from low-coarseness hardwoods and softwoods. Low-coarseness hardwoods include those fibers having a coarseness value (as measured by the OP Test Fiber Quality Analyzer) of about 10 mg/100 meters or less. Examples of low-coarseness hardwoods include Northern hardwood fibers, such as those obtained from maple and aspen, and various species of Eucalyptus. Low-coarseness softwoods have coarseness values in the 15 to 20 mg/100 m range and include Northern softwoods such as fir and spruce. An ultra-soft tissue product made from such fibers will have an overall coarseness value of about 11 mg/100 m or less. These fibers produce tissues having excellent formation and softness properties; however, they tend to be more costly than their Southern and Western counterparts. However, typical CWP products made exclusively from these low-coarseness fibers may be perceived by users as being thin.

Papermaking fibers used to form the soft absorbent, products of the present invention include cellulosic fibers commonly referred to as wood pulp fibers, liberated in the pulping process from softwood (gymnosperms or coniferous trees) and hardwoods (angiosperms or deciduous trees). Cellulosic fibers from diverse material origins may be used to form the web of the present invention, including non-woody fibers liberated from sugar cane, bagasse, sabai grass, rice straw, banana leaves, paper mulberry (i.e, bast fiber), abaca leaves, pineapple leaves, esparto grass leaves, and fibers from the genus Hesperaloe in the family Agavaceae. Also recycled fibers which may contain any of the above fibers sources in different percentages can be used in the present invention. Suitable fibers are disclosed in U.S. Pat. Nos. 5,320,710 and 3,620,911, each of which is incorporated herein by reference in its entirety.

Papermaking fibers can be liberated from their source material by any one of the number of chemical pulping processes familiar to one experienced in the art including sulfate, sulfite, polysulfite, soda pulping, etc. The pulp can be bleached if desired by chemical means including the use of chlorine, chlorine dioxide, oxygen, etc. Furthermore, papermaking fibers can be liberated from source material by any one of a number of mechanical/chemical pulping processes familiar to anyone experienced in the art including mechanical pulping, thermomechanical pulping, and chemi-thermomechanical pulping. These mechanical pulps can be bleached, if one wishes, by a number of familiar bleaching schemes including alkaline peroxide and ozone bleaching. The type of furnish suitable for use in the present invention is less critical than is the case for prior art products. A significant advantage of our process over the prior art processes is that coarse hardwoods and softwoods and significant amounts of recycled fiber can be utilized to create a soft product in our process in addition to optional premium furnish, while prior art products are required to utilize more expensive low-coarseness softwoods and low-coarseness hardwoods, such as eucalyptus to achieve such quality.

Fiber length and coarseness can be measured using the model LDA96 Fiber Quality Analyzer, available from OpTest Equipment Inc. of Hawkesbury, Ontario, Canada. These parameters can be determined using the procedure outlined in the instrument's operating manual. In general, determination of these values involves first accurately weighing a pulp sample (10–20 mg for hardwood, 25–50 mg for softwood) taken from a one-gram handsheet made from the pulp. The moisture content of the handsheet should be accurately known so that the actual amount of fiber in the sample is known. This weighed sample is then diluted to a known consistency (between about 2 and about 10 mg/l) and a known volume (usually 200 ml) of the diluted pulp is sampled. This 200 ml sample is further diluted to 600 ml and placed in the analyzer. The final consistency of pulp slurry that is used to measure coarseness is generally between about 0.67 and about 3.33 mg/liter. The weight of pulp in this sample may be calculated from the sample volume and the original weight and moisture content of the pulp that was sampled from the handsheet. This weight is entered into the analyzer and the coarseness test is run according to the operating manual's instructions.

Coarseness values are usually reported in mg/100 meters. Fiber lengths are reported in millimeters. For instruments of this type, three average fiber length measurements are usually reported. These measurements are often referred to as the number-weighted or arithmetic average fiber length ($I_n$), the length-weighted fiber length ($I_w$) and the weight-weighted fiber length ($I_z$). The arithmetic average length is the sum of the product of the number of fibers measured and the length of the fiber divided by the sum of the number of fibers measured. The length-weighted average fiber length is defined as the sum of the product of the number of fibers measured and the length of each fiber squared divided by the sum of the product of the number of fibers measured and the length of the fiber. The weight-weighted average fiber length is defined as the sum of the product of the number of fibers measured and the length of the fiber cubed divided by the sum of the product of the number of fibers and the length of the fiber squared. It is the weight-weighted fiber length that is used in describing the fiber lengths of the current invention.

A major advantage of one embodiment of the current invention is that it allows the use of coarser hardwoods and softwoods to produce ultra-soft tissues. Hardwoods having coarseness values of up to about 15 mg/100 m and softwoods with a coarseness of up to about 35 mg/100 m may be employed in the furnish, though, of course, lower-coarseness pulps may also be included in the furnish. These coarser fibers not only have the advantage of lower cost; but CWP products produced from such pulps are also often perceived by consumers as being thicker and stronger than similar tissues made from only low-coarseness fibers. The product of the present invention will preferably include from about 30 to about 85 percent of a first fiber, typically a hardwood, having a coarseness of about 15 mg/100 m or less and a fiber length of from about 0.8 to about 1.8 mm, more preferably having a coarseness of about 13.5 mg/100 m or less and a fiber length of from about 0.8 to about 1.4 mm and most preferably having a coarseness of about 12 or less and a fiber length of from about 0.8 to about 1.2 mm. The product will also preferably include from about 15 to about 70 percent of a second fiber, typically a softwood having a coarseness of no more than about 35 mg/100 meters and a fiber length of at least about 2.0 mm, more preferably a coarseness of not more than about 30 mg/100 meters and a fiber length of at least about 2.2 mm and most preferably a coarseness of no more than about 25 mg/100 meters and a fiber length of at least about 2.5 mm. Other fibers including recycled fiber and non-woody fibers may also be included; however, if present, they would typically constitute no more than about 70 percent of the tissue's total furnish. Recycled fibers, if included, would preferably replace both hardwood and softwood in an about 3/1 to about 4/1 HW/SW Ratio. The coarseness of the total furnish would preferably be in the range of from about 7 to about 18 mg/100 meters.

The product of the current invention may be prepared either as a homogenous or a stratified product. If a stratified product is produced, each sheet would typically be composed of at least two layers. The first layer would constitute from about 20 to about 50 percent of the total sheet and would be made chiefly or entirely of the first fibers described above. This layer would be on the side of the sheet that is adhered to the Yankee dryer during papermaking and would appear on the outside of the final embossed product. The remaining layers of the sheet can be composed of the second fibers described above or blends of the first and second fibers. Optionally, other fibers or fiber blends such as recycled fiber and broke, if present, can be included. If such fibers are present, they are usually located chiefly or exclusively in the non-Yankee-side, i.e., air-side, layers.

In many cases, particularly when a stratified machine is used, starches and debonders can be advantageously used simultaneously. In other cases starches, debonders or mixtures thereof may be supplied to the wet end while softeners and/or debonders may be applied by spraying.

Suitable softeners and debonders, however, will be readily apparent to the skilled artisan. Suitable softeners and debonders are widely described in the patent literature. A comprehensive list includes but non-exhaustive list includes U.S. Pat. Nos. 4,795,530; 5,225,047; 5,399,241; 3,844,880; 3,554,863; 3,554,862; 4,795,530; 4,720,383; 5,223,0965,262,007; 5,312,522; 5,354,425; 5,145,737; and EPA 0 675 225, each of which is specifically incorporated herein by reference in its entirety.

These softeners are suitably nitrogen containing organic compounds preferably cationic nitrogenous softeners and may be selected from trivalent and tetravalent cationic organic nitrogen compounds incorporating long fatty acid chains; compounds including imidazolines, amino acid salts, linear amine amides, tetravalent or quaternary ammonium salts, or mixtures of the foregoing. Other suitable softeners include the amphoteric softeners which may consist of mixtures of such compounds as lecithin, polyethylene glycol (PEG), castor oil, and lanolin.

The present invention may be used with a particular class of softener materials—amido amine salts derived from partially acid neutralized amines. Such materials are disclosed in U.S. Pat. No. 4,720,383; column 3, lines 40–41. Also relevant are the following articles: Evans, *Chemistry and Industry*, 5 Jul. 1969, pp.893–903; Egan, *J. Am. Oil Chemist's Soc.*, Vol. 55 (1978), pp. 118–121; and Trivedi et al, *J. Am. Oil Chemist's Soc.*, June 1981, pp. 754–756. All of the above are incorporated herein by reference in their entirety. As indicated therein, softeners are often available commercially only as complex mixtures rather than as single compounds. While this discussion will focus on the predominant species, it should be understood that commercially available mixtures would generally be used to practice this invention.

The softener having a charge, usually cationic, can be supplied to the furnish prior to web formation, applied directly onto the partially dewatered web or may be applied by both methods in combination. Alternatively, the softener may be applied to the completely dried, creped sheet, either on the paper machine or during the converting process. Softeners having no charge are applied at the dry end of the paper making process.

The softener employed for treatment of the furnish is provided at a treatment level that is sufficient to impart a perceptible degree of softness to the paper product but less than an amount that would cause significant runnability and sheet strength problems in the final commercial product. The amount of softener employed, on a 100% active basis, is suitably up to about 10 pounds per ton of furnish; preferably from about 0.5 to about 7 pounds per ton of furnish.

Imidazoline-based softeners that are added to the furnish prior to its formation into a web have been found to be particularly effective in producing soft tissue products and constitute a preferred embodiment of this invention. Of particular utility for producing the soft tissue product of this invention are the cold-water dispersible imidazolines. These imidazolines are mixed with alcohols or diols, which render the usually insoluble imidazolines water dispersible.

Treatment of the partially dewatered web with the softener can be accomplished in various ways. For instance, the treatment step can constitute spraying, applying with a direct contact applicator, or by employing an applicator felt. It is often preferred to supply the softener to the air side of the web so as to avoid chemical contamination of the paper making process. It has been found in practice that a softener applied to the web from either side penetrates the entire web and uniformly treats it.

Useful softeners for spray application include softeners having the following structure:

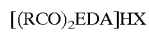

[(RCO)$_2$EDA]HX wherein EDA is a diethylenetriamine residue, R is the residue of a fatty acid having from 12 to 22 carbon atoms, and X is an anion or

[(RCONHCH$_2$CH$_2$)$_2$NR']HX wherein R is the residue of a fatty acid having from 12 to 22 carbon atoms, R' is a lower alkyl group, and X is an anion.

Another suitable softener is a dialkyl dimethyl fatty quaterary ammonium compound of the following structure:

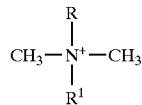

wherein R and R$^1$ are the same or different and are aliphatic hydrocarbons having fourteen to twenty carbon atoms preferably the hydrocarbons are selected from the following: C$_{16}$H$_{35}$ and C$_{18}$H$_{37}$.

A new class of softeners are imidazolines which have a melting point of from about 0° C. to about 40° C. in aliphatic diols, alkoxylated aliphatic diols, or a mixture of aliphatic diols and alkoxylated aliphatic diols. These are useful in the manufacture of the tissues of this invention. The imidazoline moiety in aliphatic polyols, aliphatic diols, alkoxylated aliphatic polyols, alkoxylated aliphatic diols or in a mixture of these compounds, functions as a softener and is dispersible in water at a temperature of from about 1° C. to about 40° C. The imidazoline moiety is of the formula:

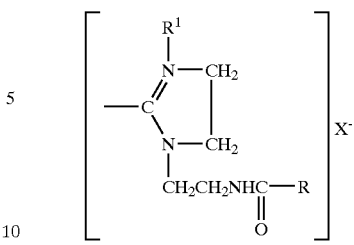

wherein X is an anion and R is selected from the group of saturated and unsaturated parafinic moieties having a carbon chain of C$_{12}$ to C$_{20}$ and R$^1$ is selected from the groups of methyl and ethyl moieties. Suitably the anion is methyl sulfate of the chloride moiety. The preferred carbon chain length is C$_{12}$ to C$_{18}$. The preferred diol is 2,2,4 trimethyl 1,3 pentane diol and the preferred alkoxylated diol is ethoxylated 2,2,4 trimethyl 1,3 pentane diol.

After the web is formed, it can be sprayed with from at least about 0.5 to about 3.5 lbs/ton of softener, more preferably about 0.5 to about 2 lbs/ton of softener. Alternatively, a softener may be incorporated into the wet end of the process to result in a web including at least about 0.5 lbs/ton of softener. It will be understood by the skilled artisan that spraying of the softener may occur after two webs have been joined to form a two-ply product.

The pulp can be mixed with temporary wet strength-adjusting agents. The pulp preferably contains up to about 10 lbs/ton of one or more strength adjusting agents, more preferably up to about 5 lbs/ton, still more preferably about 2 to about 3 lbs. Suitable wet strength agents have an organic moiety and suitably include water soluble aliphatic dialdehydes or commercially available water soluble organic polymers including aldehydic units, and cationic starches containing aldehyde moieties. These agents may be used singly or in combination with each other.

Suitable temporary wet strength agents are aliphatic and aromatic aldehydes including glyoxal, malonic dialdehyde, succinic dialdehyde, glutaraldehyde, dialdehyde starches, polymeric reaction products of monomers or polymers having aldehyde groups and optionally nitrogen groups. Representative nitrogen containing polymers which can suitably be reacted with the aldehyde containing monomers or polymers include vinyl-amides, acrylamides and related nitrogen containing polymers. These polymers impart a positive charge to the aldehyde containing reaction product.

We have found that condensates prepared from dialdehydes such as glyoxal or cyclic urea and polyol both containing aldehyde moieties are useful for producing temporary wet strength. Since these condensates do not have a charge, they are added to the web before or after the pressing roll or charged directly on the Yankee surface. Preferably these temporary wet strength agents are sprayed on the air side of the web prior to drying on the Yankee.

The preparation of cyclic ureas is disclosed in U.S. Pat. 4,625,029, which is herein incorporated by reference in its entirety. Other U.S. Patents of interest disclosing reaction products of dialdehydes with polyols include U.S. Pat. Nos. 4,656,296; 4,547,580; and 4,537,634 and are also incorporated into this application by reference in their entirety. The dialdehyde moieties expressed in the polyols render the whole polyol useful as a temporary wet strength agent in the manufacture of tissue according to the present invention. Suitable polyols are reaction products of dialdehydes such as glyoxal with polyols having at least a third hydroxyl group. Glycerin, sorbitol, dextrose, glycerin monoacrylate, and glycerin monomaleic acid ester are representative polyols useful as temporary wet strength agents.

Polysaccharide aldehyde derivatives are suitable for use in the manufacture of tissue according to the present invention. The polysaccharide aldehydes are disclosed in U.S. Pat. Nos. 4,983,748 and 4,675,394. These patents are incorporated by reference in their entirety into this application. Suitable polysaccharide aldehydes have the following structure:

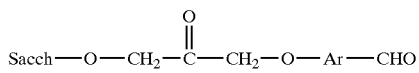

wherein Ar is an aryl group. This cationic starch is a representative cationic moiety suitable for use in the manufacture of the tissue of the present invention and can be charged with the furnish.

A starch of this type can also be used without other aldehyde moieties but, in general, should be used in combination with a cationic softener.

Our novel tissue can suitably include polymers having non-nucleophilic water soluble nitrogen heterocyclic moieties in addition to aldehyde moieties. Representative resins of this type are:

A. Temporary wet strength polymers constituting aldehyde groups and having the formula:

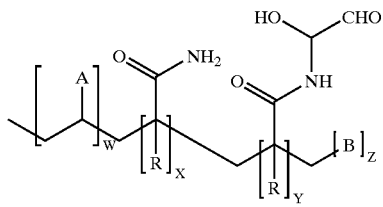

wherein A is a polar, non-nucleophilic unit which does not cause the resin polymer to become water-insoluble; B is a hydrophilic, cationic unit which imparts a positive charge to the resin polymer; each R is H, $C_1$–$C_4$ alkyl or halogen; wherein the mole percent of W is from about 58% to about 95%; the mole percent of X is from about 3% to about 65%; the mole percent of Y is from about 1% to about 20%; and the mole percent from Z is from about 1% to about 10%; the resin polymer having a molecular weight of from about 5,000 to about 200,000.

B. Water soluble cationic temporary wet strength polymers having aldehyde units which have molecular weights of from about 20,000 to about 200,000, and are of the formula:

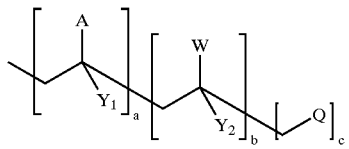

wherein A is

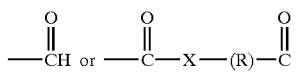

and X is —O—, —NH—, or —$NCH_3$—and R is a substituted or unsubstituted aliphatic group; $Y_1$ and $Y_2$ are independently —H, —$CH_3$, or a halogen, such as Cl or F; W is a nonnucleophilic, water-soluble nitrogen heterocyclic moiety; and Q is a cationic monomeric unit. The mole percent of "a" ranges from about 30% to about 70%, the mole percent of "b" ranges from about 30% to about 70%, and the mole percent of "c" ranges from about 1% to about 40%.

The temporary wet strength resin may be any one of a variety of water soluble organic polymers comprising aldehydic units and cationic units used to increase the dry and wet tensile strength of a paper product. Such resins are described in U.S. Pat. Nos.: 4,675,394; 5,240,562; 5,138,002; 5,085,736; 4,981,557; 5,008,344; 4,603,176; 4,983,748; 4,866,151; 4,804,769; and 5,217,576 each of which is incorporated herein by reference in its entirety. Prior to use, the cationic aldehydic water soluble polymer is prepared by preheating an aqueous slurry of approximately 5% solids maintained at a temperature of approximately 240° Fahrenheit and a pH of about 2.7 for approximately 3.5 minutes. Finally, the slurry is quenched and diluted by adding water to produce a mixture of approximately 1% solids at less than about 130° F.

Desirably a commercially available temporary wet strength resin including an aldehydic group on cationic corn waxy hybrid starch may be used. The hypothesized structure of the molecules are set forth as follows:

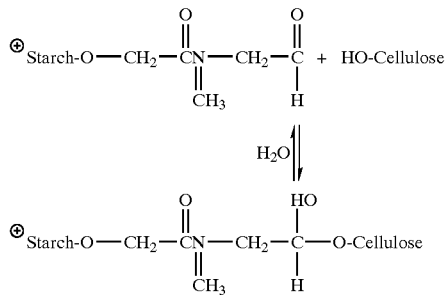

Other temporary wet strength resins are available. These starches are supplied as aqueous colloidal dispersions and do not require preheating prior to use. In addition, other commercially available temporary wet strength agents can be used, as well as those disclosed in U.S. Pat. No. 4,605,702.

Typical temporary strength adjusting agents are well known to the skilled artisan and the method and amounts for their effective use are also understood by the skilled artisan. Preferred temporary wet strength agents which may be used in the present invention include, but are not limited to, glyoxylated polyacrylamide, glyoxal and modified starches.

In accordance with one embodiment of the process of the present invention, a first nascent web is formed from the pulp. The web can be formed using any of the standard wet press configurations known to the skilled artisan, e.g., crescent former, suction breast roll, twin-wire former, etc. Once the web is formed, it preferably has a basis weight, under TAPPI LAB CONDITIONS of at least about 9 lbs/3000 sq. ft. ream, preferably at least about 10 lbs/3000 sq. ft. ream, more preferably at least about 12–14 lbs/3000 sq. ft. ream. TAPPI LAB-CONDITIONS refers to TAPPI T-402 test methods specifying time, temperature and humidity conditions for a sequence of conditioning steps.

The web is then dewatered preferably by an overall compaction process. The web is then preferably adhered to a Yankee dryer. Any suitable art recognized adhesive may be used on the Yankee dryer. Suitable adhesives are widely described in the patent literature. A comprehensive but non-exhaustive list includes U.S. Pat. Nos. 5,246,544; 4,304,625; 4,064,213; 4,501,640; 4,528,316; 4,883,564; 4,684,439; 4,886,579; 5,374,334; 5,382,323; 4,094,718; and 5,281,307. Typical release agents can be used in accordance with the present invention.

The web is then creped from the Yankee dryer and optionally calendered. Creping is preferably carried out at a creping angle of from about 70° to about 88°, preferably about 73° to about 850 and more preferably at about 80°.

Figure 4:
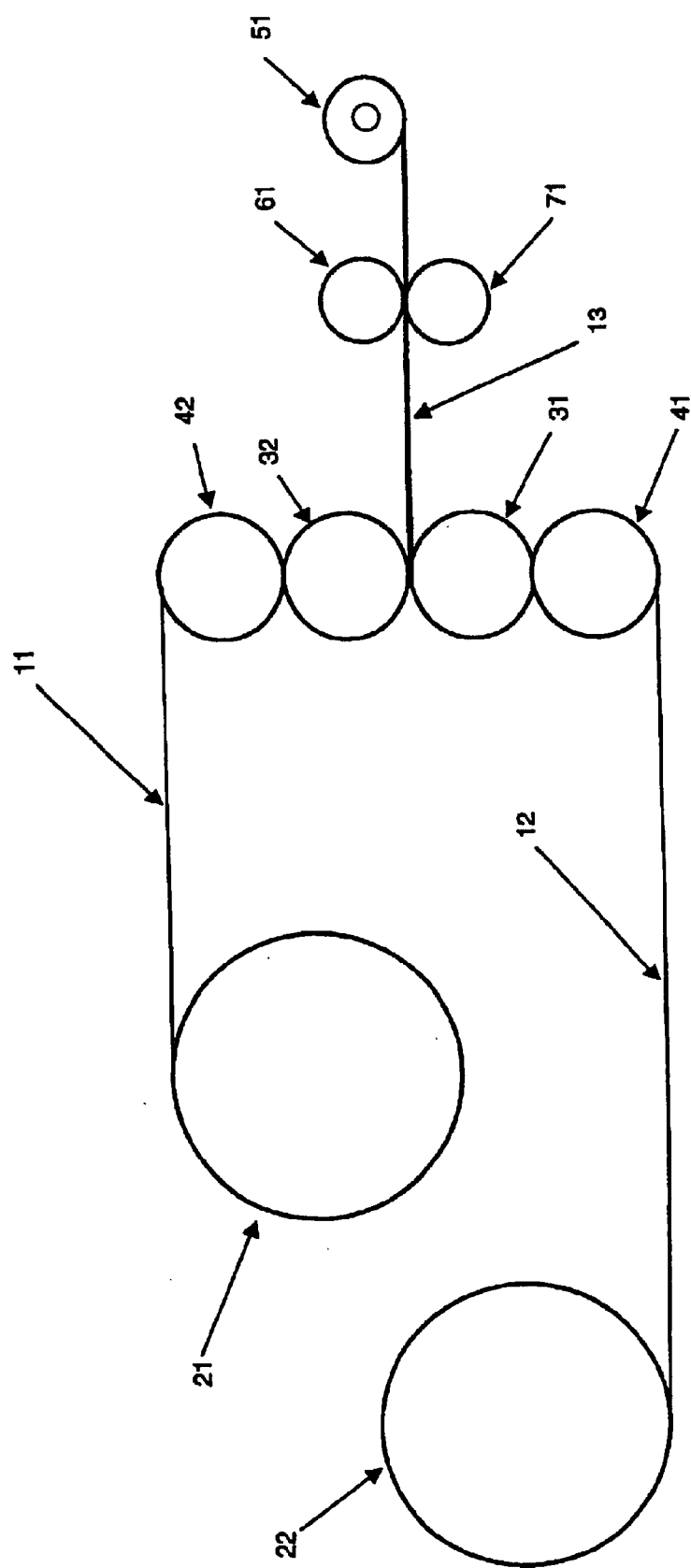
FIG. 4 is a schematic drawing of a preferred converting process of the present invention wherein two webs are each embossed separately and combined by knurling to form a multi-ply product.

The product according to the present invention is a multi-ply product. Two or more plies of tissue are adhered to one another preferably by the use of knurling wheels, embossing and perforating the two plies together, and/or the use of adhesives. One embodiment of the present invention is an emboss process as shown in FIG. 4. In this process, cellulosic webs 11 and 12, supplied from parent rolls 21 and 22, are embossed separately between emboss rolls 31 and 32 and backing rolls 41 and 42. The two embossed webs are married such that the protrusions transferred to the webs 11 and 12 are in a face-to-face relationship on the inside of the two-ply web 13. Because the two plies have been embossed separately, it is necessary to marry them together to keep them from separating during use. This marrying may be done by passing the combined web 13 through the nip formed by a knurling wheel 61 and an anvil roll 71, as shown in FIG. 4. Typically, there are a plurality of knurling wheels arranged along the width of the web so that all individual tissue rolls that are cut from the finished roll 51 have at least one knurl holding the two plies together. Other methods of joining the two embossed plies together, such as ply gluing, may also be used. Again, the combined web 13 may be perfed and/or calendered (not shown) prior to being wound onto the finished roll 51.

The emboss pattern used to produce the patterns in the current invention may be any art-recognized pattern. The two patterns may be identical or of different design. In one preferred embodiment, the two patterns are mirror images of each other. Preferably, at least one of the patterns contains macro and micro elements. Micro elements will generally be more numerous and of much finer scale than the macro elements typically used in conventional embossing patterns.

It should be noted that, although the embossed webs are joined such that the embossed portions of the two webs are facing each other, it is not necessary that the patterns formed by the emboss rolls be particularly aligned with respect to each other. Because of this feature, the setup time for this process is less than that used in the case of point-to-point or nested embossing, where the protrusions formed during embossing must be aligned such that the protrusions contact each other (as in point-to-point embossing) or that the protrusions on one web contact unembossed areas on the other web (as in nested embossing).

Figure 5:
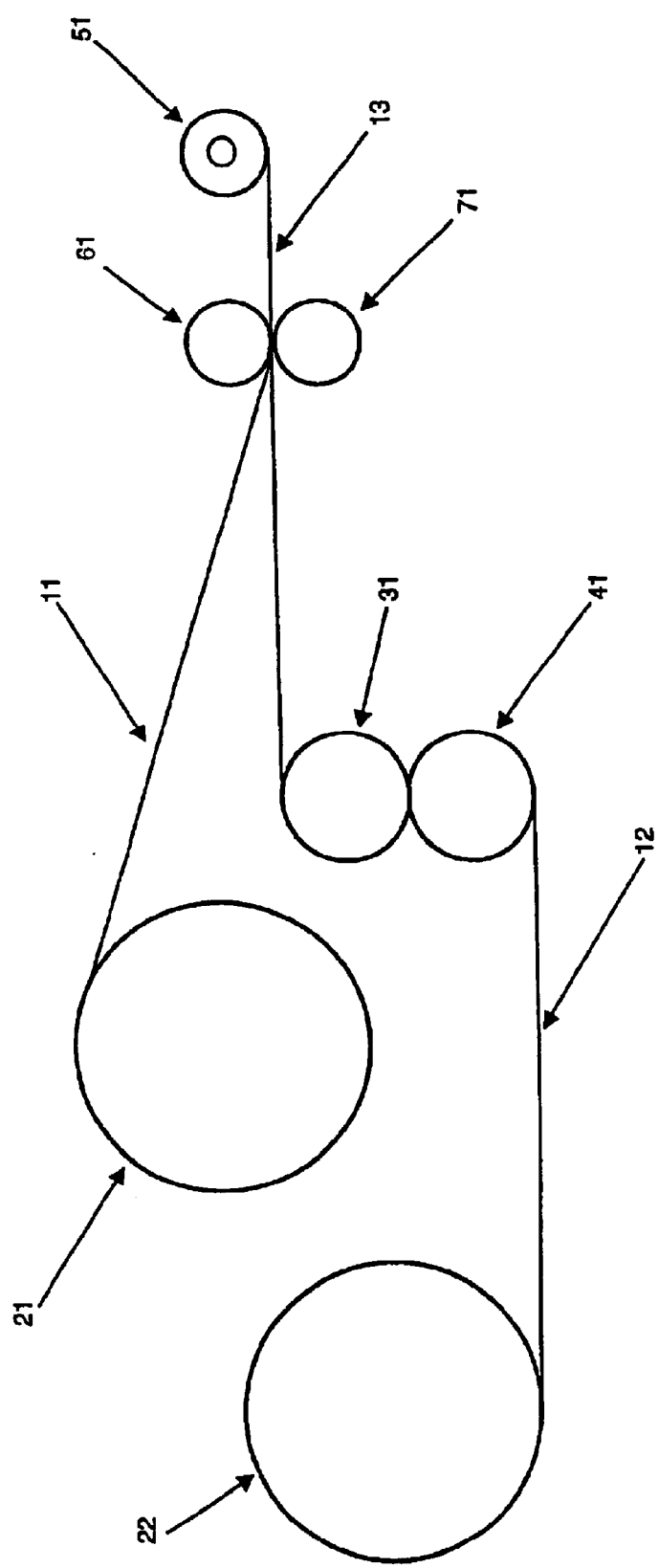
FIG. 5 is a schematic drawing of a preferred converting process of the present invention wherein one web is embossed and combined with an unembossed web by knurling to form a multi-ply product.

Another embodiment of the current invention as shown in FIG. 5, is an emboss process wherein only one of the webs is embossed. In this case the web 12, which is embossed between the emboss roll 31 and the backing roll 41, is combined with an unembossed web 11 such that the protrusions formed in the web 12 by the embossing process are joined with the web 11 on the inside of the combined web. As was the case for the embodiment where both webs were embossed, the two-ply web 13 must have its plies married together. Again, this marrying may be done by knurling, as shown in FIG. 5, by gluing the two plies together, combinations thereof, or by any other art-recognized process. As was the case for the embodiment of the invention where both plies are embossed, emboss patterns that contain macro and micro elements are preferred.

Although the processes of the current invention have been described for two-ply structures, it should be obvious to one skilled in the art that these processes can be extended to include structures made up of three or more plies. In such cases, two of the plies could be joined together prior to embossing and joining with the other ply or plies. Alternatively, one or more unembossed plies could be sandwiched between the embossed plies such that the protrusions from each embossed ply contact an unembossed ply on the inside of the sheet. Such variations are within the scope of the current invention.

In one alternative embodiment, the two plies may be adhered using an adhesive either alone or in conjunction with an embossing or knurling pattern. Suitable adhesives are well known and will be readily apparent to the skilled artisan. According to this embodiment, the two plies are embossed with adhesive being applied only to the tips of the raised bosses of the product and ultimately located between the two plies of the product.

The calendering and embossing of the webs preferably combines to form a multi-ply web having a specific caliper of the multi-ply web of at least about 2 mils/8 sheets/lb. basis weight, more preferably from about 2.5 to about 5 mils/8 sheets/lb basis weight and most preferably from about 3.0 to about 4.5 mils/8 sheets/lb basis weight.

The caliper of the tissue of the present invention may be measured using the Model II Electronic Thickness Tester available from the Thwing-Albert Instrument Company of Philadelphia, Pa. The caliper is measured on a sample consisting of a stack of eight sheets of tissue using a two-inch diameter anvil at a 539±10 gram dead weight load.

The bulk density of a tissue product is determined by immersing a sample of the product in a nonswelling liquid and measuring the amount of liquid absorbed by the sample. Care should be taken to insure that the sample to be tested has been subjected to minimal handling. To measure bulk density, a one-inch by one-inch sample of the tissue is cut and weighed to 0.0001 gram. Using self-holding tweezers to grasp the tissue specimen at a corner, the sample is then completely immersed in Porofil 3 Wetting Liquid. Porofil 3 Wetting Liquid can be obtained from Coulter Electronics of Hialeah, Fla. The sample is immersed for ten seconds. Then, using tweezers, the sample is removed from the liquid and allowed to drain for thirty seconds while being held suspended. Care should be taken not to shake the sample during draining. After the tissue specimen has been drained, one of its corners is lightly touched to blotter paper to remove any excess liquid. The specimen is then transferred to a balance and the sample's wet weight is obtained to the nearest 0.0001 gram. The bulk density is expressed in % weight gain and is obtained using the formula: Bulk Density (%)=[(Wet weight−Dry weight)/Dry Weight]*100. Bulk Density has been found to positively correlate with several important tissue attributes; consequently, higher bulk density values are preferred.

The tensile stiffness (also referred to as stiffness modulus or tensile modulus) is determined by the procedure for measuring tensile strength described below, except that a sample width of 1 inch is used and the modulus recorded is the chord slope of the load/elongation curve measured over the range of 0–50 grams load. The tensile stiffness of a tissue product is the geometric mean of the values obtained by measuring the tensile stiffness in machine and cross-machine directions. The specific tensile stiffness of the web is preferably less than about 2.0 g/inch/% strain per pound of basis weight and more preferably less than about 1.0 g/inch/% strain per pound of basis weight, most preferably less than about 0.75 g/inch/% strain per pound of basis weight.

Tensile strength of tissue produced in accordance with the present invention is measured in the machine direction and cross-machine direction on an Instron Model 4000: Series IX tensile tester with the gauge length set to 3 inches. The area of tissue tested is assumed to be 3 inches wide by 3 inches long (the distance between the grips). In practice, the length of the samples is the distance between lines of perforation in the case of machine direction tensile strength and the width of the samples is the width of the roll in the case of cross-machine direction tensile strength. A 20 pound load cell with heavyweight grips applied to the total width of the sample is employed. The maximum load is recorded for each direction. The results are reported in units of "grams per 3-inch"; a more complete rendering of the units would be "grams per 3-inch by 3-inch strip." The geometric mean tensile of the present invention, when normalized for basis weight, will preferably be between about 21 and about 35 grams per 3 inches per pound per ream. The ratio of MD to CD tensile is also important and is preferably between about 1.25 and about 3, more preferably between about 1.5 and about 2.5.

Throughout this application, by basis weight, we mean basis weight in pounds per 3000 square ft. ream of the web. Many of the values provided throughout the specification have been normalized.

The wet tensile of the tissue of the present invention is measured using a three-inch wide strip of tissue that is folded into a loop, clamped in a special fixture termed a Finch Cup, then immersed in a water. The Finch Cup, which is available from the Thwing-Albert Instrument Company of Philadelphia, Pa, is mounted onto a tensile tester equipped with a 2.0 pound load cell with the flange of the Finch Cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time. For temporary wet strength grades, the wet tensile of the present invention will be at least about 1.5 grams per three inches per pound per ream in the cross direction as measured using the Finch Cup more preferably at least about 2 and most preferably at least about 2.5. Normally, only the cross direction wet tensile is tested, as the strength in this direction is normally lower than that of the machine direction and the tissue is more likely to fail in use in the cross-machine direction.

For bath tissue, it is important that the product's wet strength be of a temporary nature, so that the tissue will disintegrate fairly quickly after use without posing a clogging problem for the toilet or its associated plumbing. Insuring that a product's wet strength is temporary can be accomplished by the same wet tensile test described above with the soak time increased from five seconds to a longer time period. By comparing the sheet's initial wet tensile strength (5 second soak) to that obtained after longer soak times, the percent wet tensile remaining can be calculated. The wet strength of a product can be considered to be temporary as long as no more than about 50% of the tissue's initial wet strength (measured in the cross-machine direction) remains after a soak time of 10 minutes.

Softness is a quality that does not lend itself to easy quantification. J. D. Bates, in "Softness Index: Fact or Mirage?" *TAPPI*, Vol. 48 (1965), No. 4, pp. 63A–64A, indicates that the two most important readily quantifiable properties for predicting perceived softness are (a) roughness and (b) what may be referred to as stiffness modulus. Tissue produced according to the present invention has a more pleasing texture as measured by the sidedness parameter or reduced values of either or both roughness and stiffness modulus (relative to control samples). Surface roughness can be evaluated by measuring average deviation in the average friction (GMMMD) using a Kawabata KES-SE Friction Tester equipped with a fingerprint-type sensing unit using the low sensitivity range. A 50 g stylus weight is used, and the instrument readout is divided by 20 to obtain the mean deviation. The geometric mean deviation in the average surface friction is then the square root of the product of the average or mean deviation in the machine direction and the cross-machine direction.

Surface roughness can also be evaluated according to the TMI method, which is used herein. The TMI method is preferred when evaluating surface friction and sidedness values. Although the above procedure is described in the context of the Kawabata equipment, the friction values noted herein are expressed in TMI units. Friction values can be roughly converted between Kawabata and TMI units although we have found that results from the Kawabata instruments seem to be considerably less reproducible and, in our opinion, are far less useful in predicting perceived softness. Although we find that there is a very significant amount of scatter between Kawabata results and TMI results, the following equation may be used for approximate conversion between Kawabata friction units and TMI friction units: TMI friction=6.1642 (Kawabata Friction)−0.65194.

Geometric Mean Tissue Friction and Sidedness

Sidedness and friction deviation measurements for the practice of the present invention can be accomplished using a Lab Master Slip & Friction tester, with special high-sensitivity load measuring option and custom top and sample support block, available from:

Testing Machines Inc.
2910 Expressway Drive South
Islandia, N.Y. 11722
800-678-3221
www.testingmachines.com
adapted to accept a Friction Sensor, available from:
Noriyuki Uezumi
Kato Tech Co., Ltd.
Kyoto Branch Office
Nihon-Seimei-Kyoto-Santetsu Bldg. 3F
Higashishiokoji-Agaru, Nishinotoin-Dori
Shimogyo-ku, Kyoto 600-8216
Japan
81-75-361-6360
katotech@mx1.alpha-web.ne.jp The software for the Lab Master Slip and Friction tester is modified to allow it to: (1) retrieve and directly record instantaneous data on the force exerted on the friction sensor as it moves across the samples; (2) compute an average for that data; (3) calculate the deviation—absolute value of the difference between each of the instantaneous data points and the calculated mean; and (4) calculate a mean deviation over the scan to be reported in grams.

Prior to testing, the test samples should be conditioned in an atmosphere of 23.0°±1° C. (73.4°±1.8° F.) and 50%±2% R.H. Testing should also be conducted at these conditions. The samples should be handled by edges and corners only and any touching of the area of the sample to be tested should be minimized as the samples are delicate, and physical properties may be easily changed by rough handling or transfer of oils from the hands of the tester.

The samples to be tested are cut using a paper cutter to get straight edges, any sheets with obvious imperfections being removed and replaced with acceptable sheets. The sheets should be maintained, where applicable, in consecutive order.

Sample Preparation

Finished Multi-Ply Product

Four consecutive sheets are cut from the sample roll using a guillotine or pivoting blade paper cutter. The machine direction being indicated by drawing an arrow in a corner of each sheet, the first sheet being labeled as "MDT", the second as "CDT", the third as "MDB" and the fourth as "CDB". Note that as tissue is removed from a roll, the "top" side of a sample is always on the outside of the roll.

Sample Preparation—Plies of Precursor (after embossing, if any, and prior to marrying)

Pull approximately 20 inches of the ply. Cut a total of four 4.5-in.×4.5-in. squares using a paper cutter from the sample as indicated above. Indicate the machine direction as above. Label each square with the testing direction and side. (Square#1 should be labeled MDT for two scans in the cross machine direction on the topside, Square#2 should be labeled CDT, Square#3—MDB and Square#4—CDB). The area to be tested should be free of folds or creases. Repeat this procedure for the other ply. Where it is inconvenient to obtain the plies before the marrying process, it is generally acceptable to obtain the plies by separating the plies of the finished multi-ply product as the effect of the marrying and rewinding procedure is fairly subtle.

Scanning Procedure

Each specimen is placed on the sample table of the tester and the edges of the specimen are aligned with the front edge of the sample table and the chucking device. A metal frame is placed on top of the specimen in the center of the sample table while ensuring that the specimen is flat beneath the frame by gently smoothing the outside edges of the sheet. The sensor is placed carefully on the specimen with the sensor arm in the middle of the sensor holder.

To compute GMMMD of the finished products, two scans of the sensor head are run on the MD topside of the first sheet, where The Average Deviation value from the first MD scan of the topside of sheet MDT is recorded as $MD_{TS1}$, the result obtained on the second scan on the top side of sheet MDT is recorded as $MD_{TS2}$: $CD_{TS3}$ and $CD_{TS4}$ are the results of the scans run on the CD top side of the sheet CDT, $MD_{BS5}$; $MD_{BS6}$ are the results of the scans on the bottom sides of sheet MDB; and $CD_{BS7}$ and $CD_{BS8}$ are the results of the scans on the bottom sides of sheet CDB.

To compute the GMMMD of the individual plies, scans of the sensor head are similarly run over the specimens, two in the MD on the topside of one specimen, two in the CD on the topside of a second specimen followed by another two in the MD on the bottom of the first specimen and two in the CD on the topside of the second specimen with the Average Deviation value from the specimen window being recorded as above. The second scan is run in the same direction over the same path as the first by returning the stylus to its starting point after the first.

For each sample, the Geometric Mean Mean Deviation (GMMMD) is calculated as described below and the average GMMMD recorded to the nearest thousandth. The standard deviation, minimum and maximum values should also be available.

Surface Friction Calculations

1) To calculate the GMMMD for replicate number one:

$$GMMMD_1 = \frac{\sqrt{MD_{TS1} * CD_{TS4}} + \sqrt{MD_{BS5} * CD_{BS8}}}{2}$$

2) To calculate the GMMMD for replicate number two:

$$GMMMD_2 = \frac{\sqrt{MD_{TS2} * CD_{TS3}} + \sqrt{MD_{BS6} * CD_{BS7}}}{2}$$

3) To calculate the overall GM friction or $GMMMD_O$, average $GMMMD_1$ and $GMMMD_2$.

$$GMMMD_O = \frac{GMMMD_1 + GMMMD_2}{2}$$

The MD and CD designation indicates whether the test was done in the machine direction (MD) or cross-machine direction (CD). The subscript "B" designates the Bottom side while the subscript "T" indicates the top.

The Geometric Mean for the top side of tissue friction is calculated as follows:

$$GMMMD_{T1} = \sqrt{MD_{TS1} * CD_{TS4}}$$

$$GMMMD_{T2} = \sqrt{MD_{TS2} * CD_{TS3}}$$

$$GM\ Friction_T = \frac{GMMMD_{T1} + GMMMD_{T2}}{2}$$

The MD and CD designation indicates whether the test was done in the machine direction (MD) or cross-machine direction (CD). The subscript "T" designates the Top side.

The Geometric Mean for the bottom side of tissue friction is calculated as follows:

$$GMMMD_{B1} = \sqrt{MD_{BS5} * CD_{BS8}}$$

$$GMMMD_{B2} = \sqrt{MD_{BS6} * CD_{BS7}}$$

$$GM\ Friction_B = \frac{GMMMD_{B1} + GMMMD_{B2}}{2}$$

The MD and CD designation indicates whether the test was done in the machine direction (MD) or cross-machine direction (CD). The subscript "B" designates the Bottom side.

Sidedness is an indication of how different the friction is on the two sides of the sheet. The sidedness is defined as:

$$\text{Multi-Ply Sidedness} = \frac{GM\ Friction_H}{GM\ Friction_L} * GM\ Friction_M$$

$$\text{Top Ply Sidedness} = \frac{GM\ Friction_H}{GM\ Friction_L} * GM\ Friction_T$$

$$\text{Bottom Ply Sidedness} = \frac{GM\ Friction_H}{GM\ Friction_L} * GM\ Friction_B$$

where "H" and "L" subscripts refer to the higher and lower values of the friction deviation of the two sides (Top or Bottom)—that is the larger friction value is always placed in the numerator. The subscript "M" indicates Multi-ply, subscript "T" indicates Top ply, and subscript "B" indicates Bottom ply.

For most creped products, the air side friction deviation will be higher than the friction deviation of the Yankee side. Sidedness takes into account not only the relative difference between the two sides of the sheet but the overall friction level. Accordingly, low sidedness values are normally preferred.

Formation of tissues of the present invention, as represented by Kajaani Formation Index Number, should be at least about 54, preferably about 60, more preferably at least about 62, as determined by measurement of transmitted light intensity variations over the area of a single sheet of the tissue product using a Kajaani Paperlab 1 Formation Analyzer which compares the transmitivity of about 250,000 subregions of the sheet. The Kajaani Formation Index Number, which varies between about 20 and 122, is widely used through the paper industry and is for practical purposes identical to the Robotest Number which is simply an older term for the same measurement.

TAPPI 401 OM-88 (Revised 1988) provides a procedure for the identification of the types of fibers present in a sample of paper or paperboard and an estimate of their quantity. Analysis of the amount of the softener/debonder chemicals retained on the tissue paper can be performed by any method accepted in the applicable art. For the most sensitive cases, we prefer to use x-ray photoelectron spectroscopy ESCA to measure nitrogen content, the amounts in a certain location within the tissue sheet being measurable by using the tape pull procedure described above combined with ESCA analysis of each "split." Normally the background level is quite high and the variation between measurements quite high, so use of several replicates in a relatively modern ESCA system such as at the Perkin Elmer Corporation's model 5,600 is required to obtain more precise measurements.

The level of cationic nitrogenous softener/debonder such as Quasoft®202-JR can alternatively be determined by solvent extraction of the softener/debonder by an organic solvent followed by liquid chromatography determination of the softener/debonder. TAPPI 419 OM-85 provides the qualitative and quantitative methods for measuring total starch content. However, this procedure does not provide for the determination of starches that are cationic, substituted, grafted, or combined with resins. These types of starches can be determined by high pressure liquid chromatography. (TAPPI, Journal Vol. 76, Number 3.)

The typical tissue embossing process relating to multi-ply tissues involves the compression and stretching of the flat tissue base sheets between a relatively soft (40 Shore A) rubber roll and a hard roll which has relatively large "macro" signature emboss elements. This embossing improves the aesthetics of the tissue and the structure of the tissue roll. However, the thickness of the base sheet between the signature emboss elements is actually reduced. This lowers the perceived bulk of a CWP product made by this process. Also, in conventional products this process makes the tissue two-sided, as the male emboss elements create protrusions or knobs on only one side of the sheet.

Smaller, closely spaced "micro" elements can be added to the emboss pattern to improve the perceived bulk of the rubber to steel embossed product. However, this results in a harsh product in conventionally embossed products. This is because small elements in a rubber to steel process create many small, stiff protrusions on one side of the tissue, resulting in a high roughness. However, in the practice of the present invention the small stiff protrusions are concealed between the plies of the finished product, obviating this problem.

According to one embodiment of the process of the present invention, one web of the tissue is embossed between an emboss roll and a rubber backup roll. The other web can also be embossed between an emboss roll and a rubber backup roll or can be unembossed. The webs are then combined in a manner so as to dispose the embossed side(s) having protrusions to the interior of the finished multi-ply product.

Figure 6:
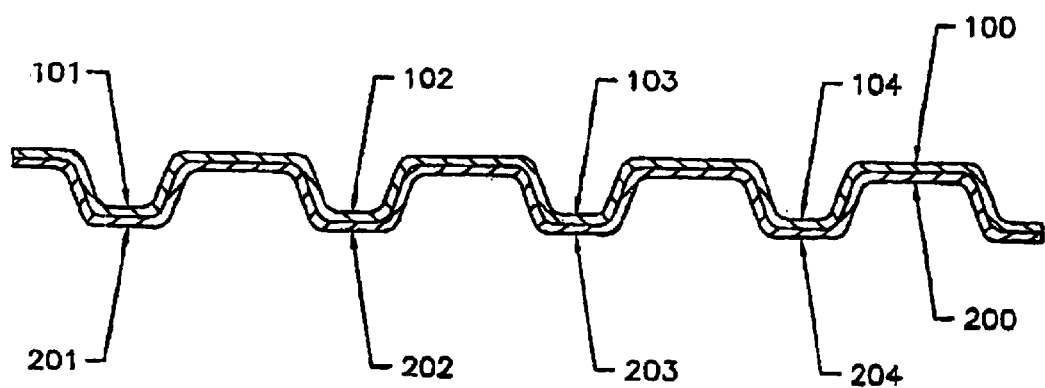
FIG. 6 illustrates a conventional two-ply embossed product.

FIG. 6 illustrates a conventional embossed two-ply tissue where two unembossed plies are joined and embossed together. Indentations 101, 102, 103, and 104 are impressed in the top web 100 creating protrusions 201, 202, 203, and 204 in the bottom web 200. This emboss imparts an increased roughness on one side of the product creating an increased overall sidedness of the two-ply tissue.

Figure 7:
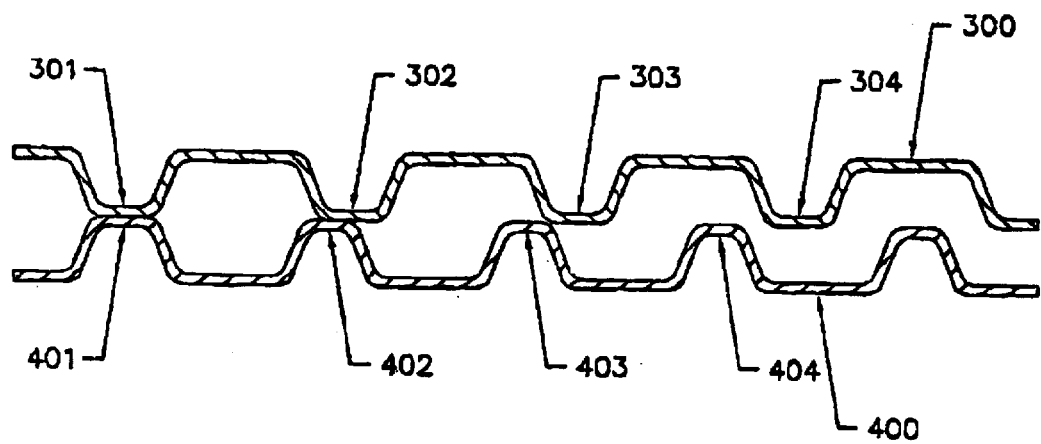
FIG. 7 illustrates a preferred two-ply embossed product of the present invention wherein each ply is embossed separately and the protrusions are in face-to-face relationship on the interior of the product.

FIG. 7 illustrates one embossing embodiment of the present invention where each ply is separately embossed then joined together. The top web 300 is embossed creating indentations 301, 302, 303, and 304 which result in protrusions on the other side of the web. The bottom web 400 is separately embossed creating indentations 401, 402, 403, and 404 which result in protrusions on the other side of the web. The two embossed webs are married such that the protrusions on the webs 300 and 400 are in a face-to-face relationship on the inside of the two-ply tissue. It is not necessary that the protrusions on one ply be aligned with the protrusions on the other.

Figure 8:
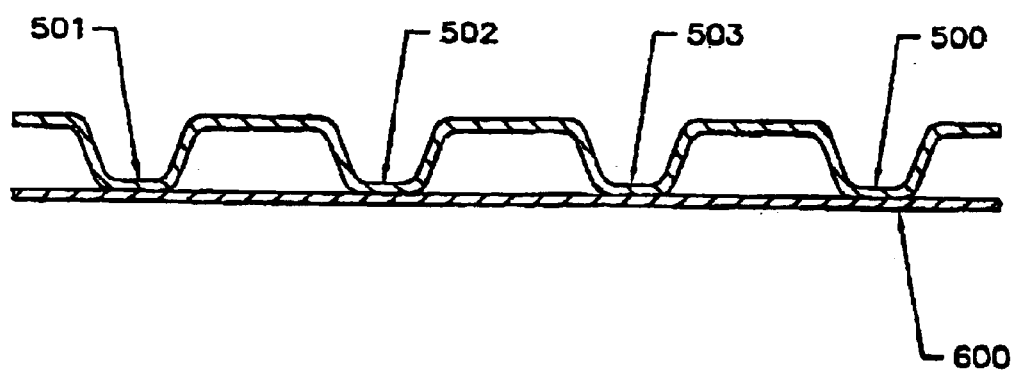
FIG. 8 illustrates a preferred two-ply embossed product of the present invention wherein one ply is embossed, the other ply is unembossed, and the protrusions are on the interior of the product.

FIG. 8 illustrates another embossing embodiment of the present invention where one ply is separately embossed then married together with an unembossed ply. The top web is embossed creating indentations 500, 501, 502, and 503 which result in protrusions on the other side of the web. The bottom web 600 is not embossed. The two webs are married such that the protrusions on the embossed web are disposed on the interior of the two-ply tissue.

Figure 9:
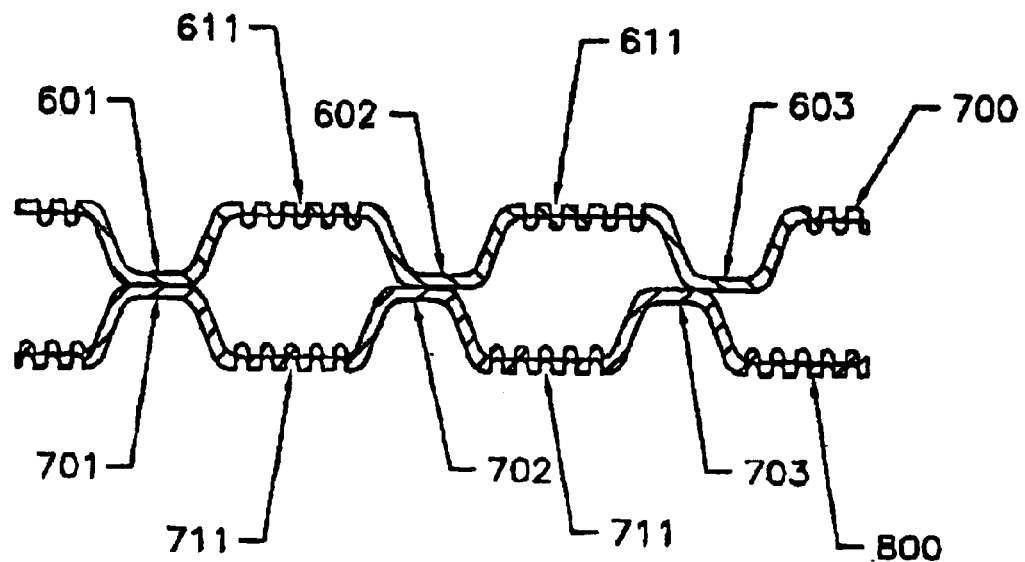
FIG. 9 illustrates a preferred two-ply embossed product of the present invention wherein each ply is embossed with a macro and micro pattern and the protrusions are in face-to-face relationship on the interior of the product.

FIG. 9 illustrates another embossing embodiment of the present invention where each ply is separately embossed then married together. The top web 700 is embossed creating macro pattern indentations 601, 602, and 603 and micro pattern indentations 611 which result in protrusions on the other side of the web. The bottom web 800 is separately embossed creating indentations 701, 702, and 703 and micro pattern indentations 711 which result in protrusions on the other side of the web. The two embossed webs are married such that the protrusions on the webs 700 and 800 are in a face-to-face, but not necessarily aligned, relationship on the inside of the two-ply tissue.

Figure 10:
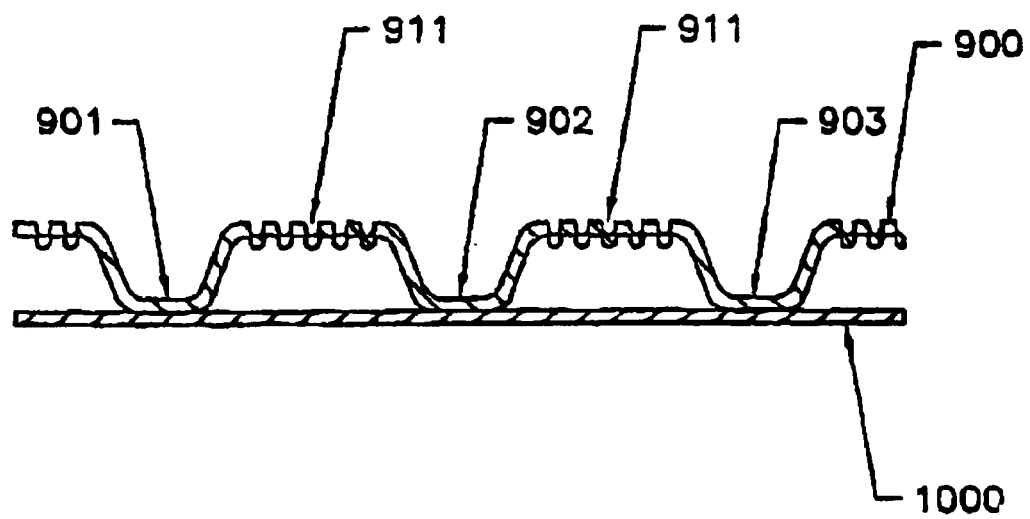
FIG. 10 illustrates a preferred two-ply embossed product of the present invention wherein only one ply is embossed with a macro and micro pattern, the other ply is unembossed, and the protrusions are on the interior of the product.

FIG. 10 illustrates another embossing embodiment of the present invention where one ply is separately embossed then married with an unembossed ply. The top web 900 is embossed creating macro pattern indentations 901, 902, and 903 and micro pattern indentations 911 which result in protrusions on the other side of the web. The bottom web 1000 is not embossed. The two webs are married such that the protrusions on the embossed web are disposed on the interior of the two-ply tissue.

Figure 11:
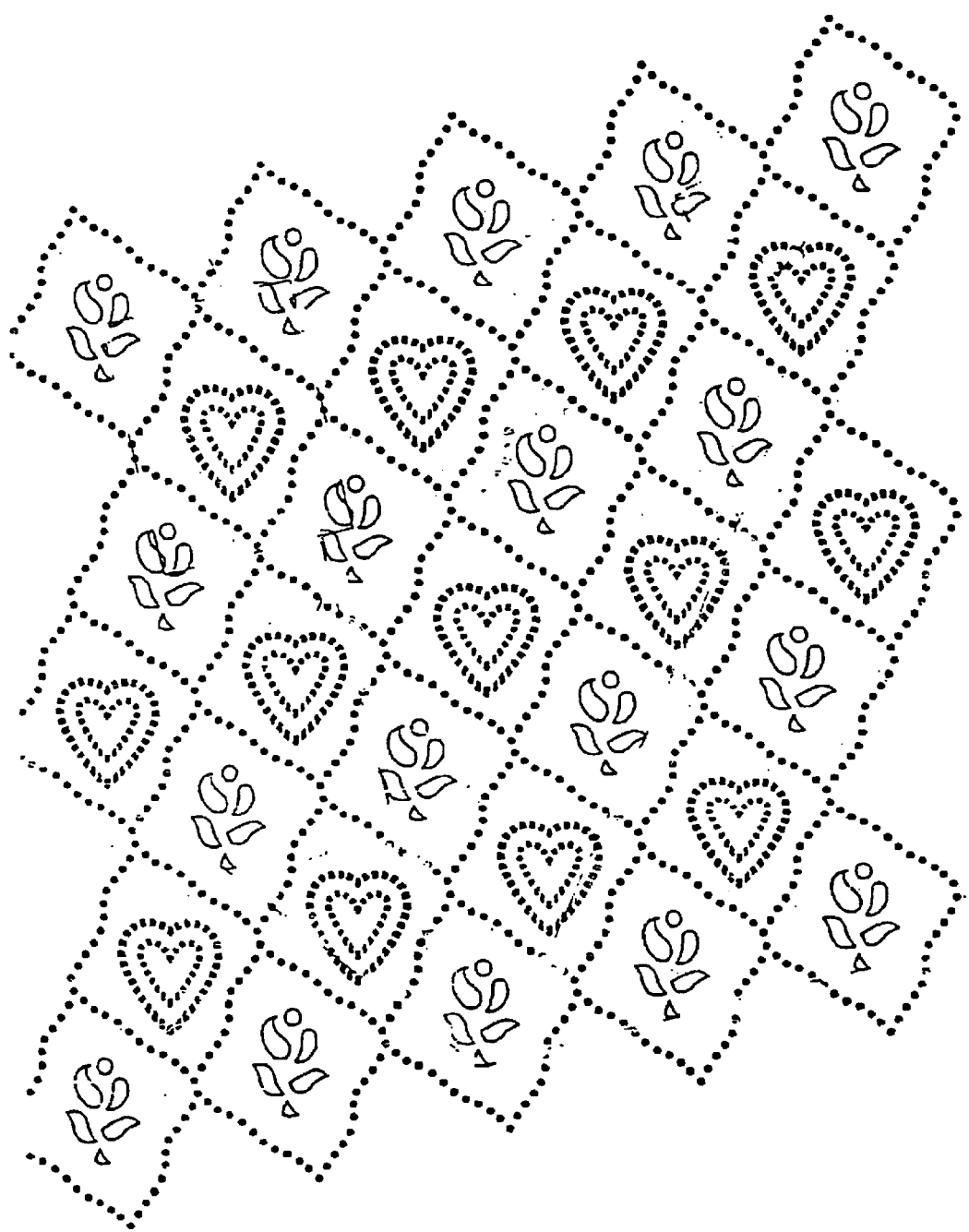
FIG. 11 illustrates an emboss pattern for use according to the present invention.
Figure 12:
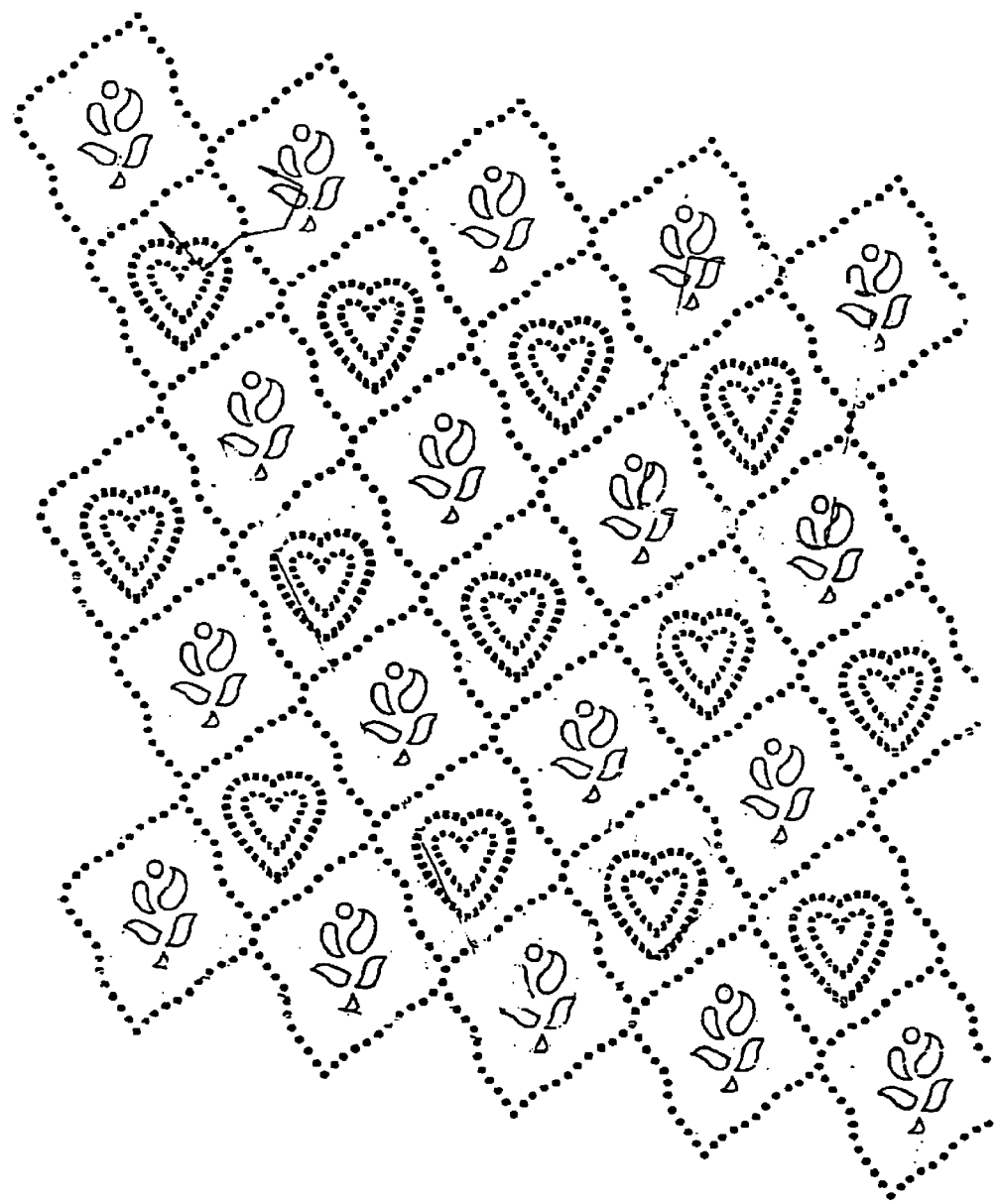
FIG. 12 illustrates the mirror image emboss pattern of FIG. 11.
Figure 13:
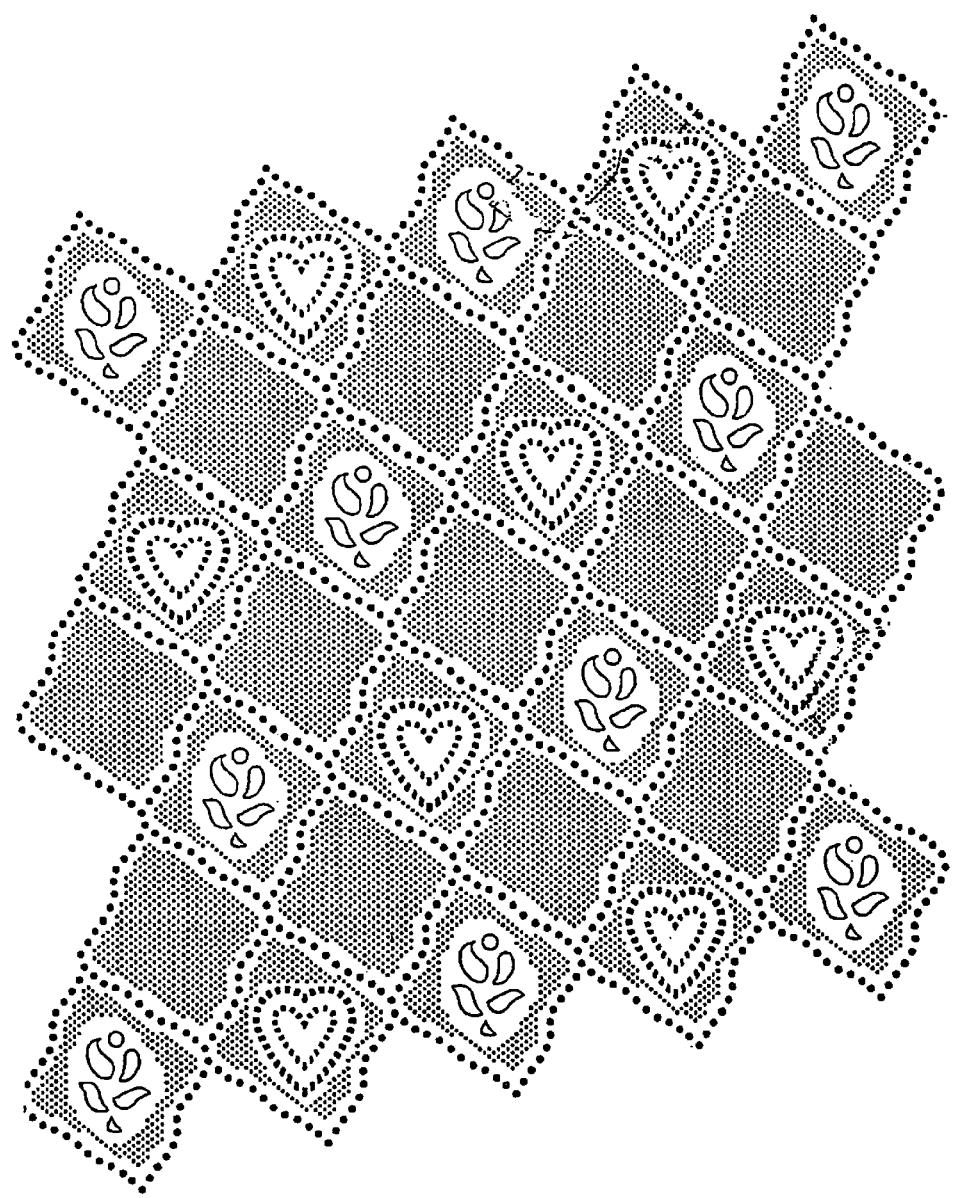
FIG. 13 illustrates a preferred emboss pattern for use according to the present invention. The pattern contains both macro or large elements and micro or very small background elements.
Figure 14:
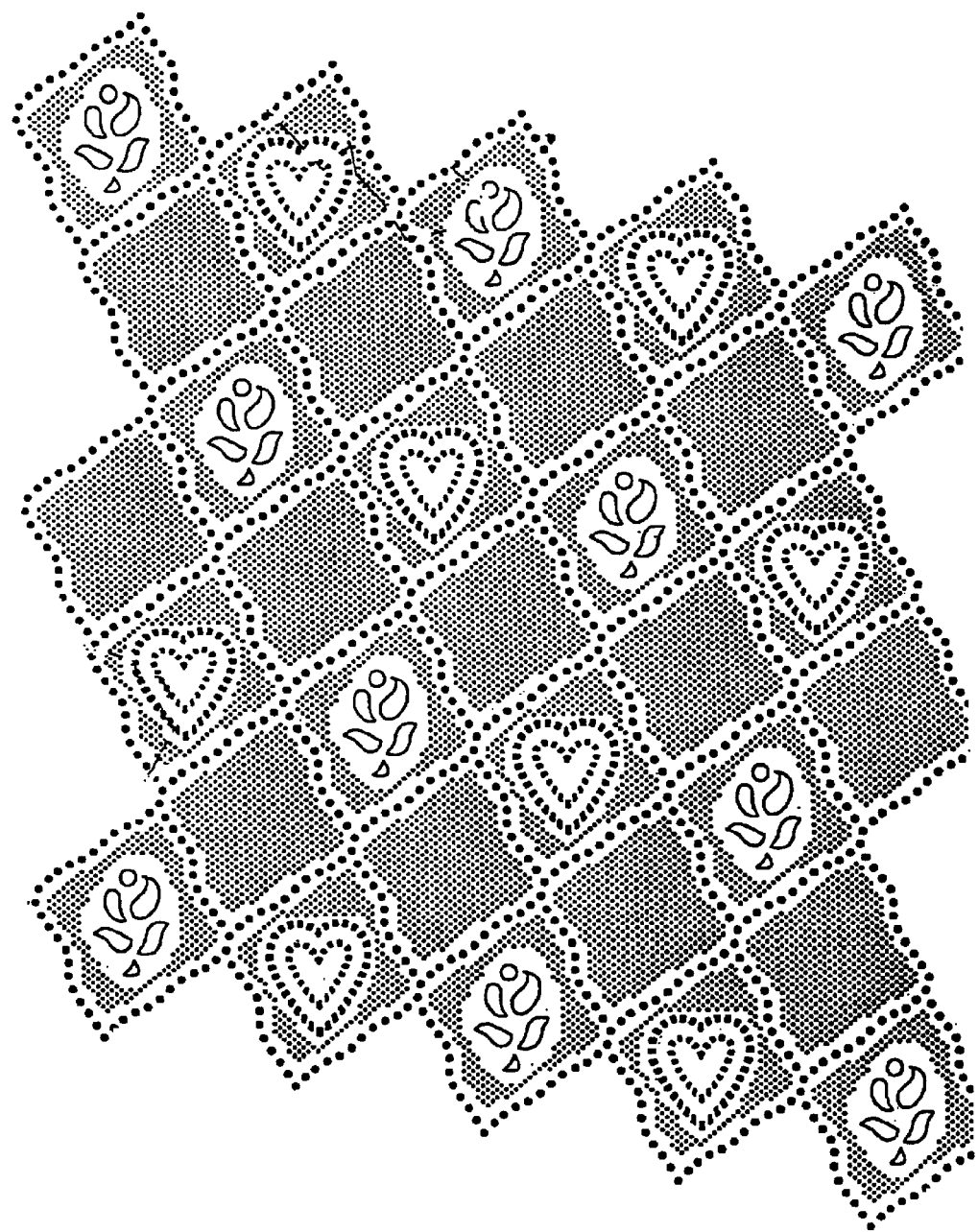
FIG. 14 illustrates the mirror image emboss pattern of FIG. 13.

FIGS. 11 and 12 depict a preferred emboss pattern for use with the present invention. A more preferred pattern according to the present invention includes "micro" elements. More preferred emboss patterns for the present invention are shown in FIGS. 13 and 14. These patterns are exact mirror images of one another. This emboss pattern combines circular micro dots with a large, signature or "macro" pattern. This combination pattern provides aesthetic appeal from the macro pattern as well as the improvement in perceived bulk and texture created by the micro pattern.

Specific preferred embodiments of the present invention are illustrated and contrasted to the prior art in the following non-binding examples which should not be construed as restricting the invention other than as set forth in the appended claims.

EXAMPLES

The following examples are representative of the present invention and are not to be construed as limiting the invention as described herein.

Example 1

Tissue base sheets were formed from a furnish consisting of 70% hardwood having a fiber length of 0.85 mm and a coarseness of 9.6 mg/100 m and 30% softwood which had a fiber length of 2.98 mm and a coarseness of 16.0 mg/100 m. Refining of the entire furnish was used to control base sheet strength. Six pounds per ton of a temporary wet strength agent was added to the furnish. The sheet was sprayed with two pounds per ton of a softener which was applied to the sheet while it was on the felt. The sheet was creped using a square creping blade at 20% crepe. The average base sheet physical properties are shown in Table 1.

TABLE 1

Base Sheet Physical Properties

| Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
| --- | --- | --- | --- | --- | --- | --- |
| 11.4 | 33.7 | 604 | 332 | 21.4 | 5.3 | 104 |

Figure 3:
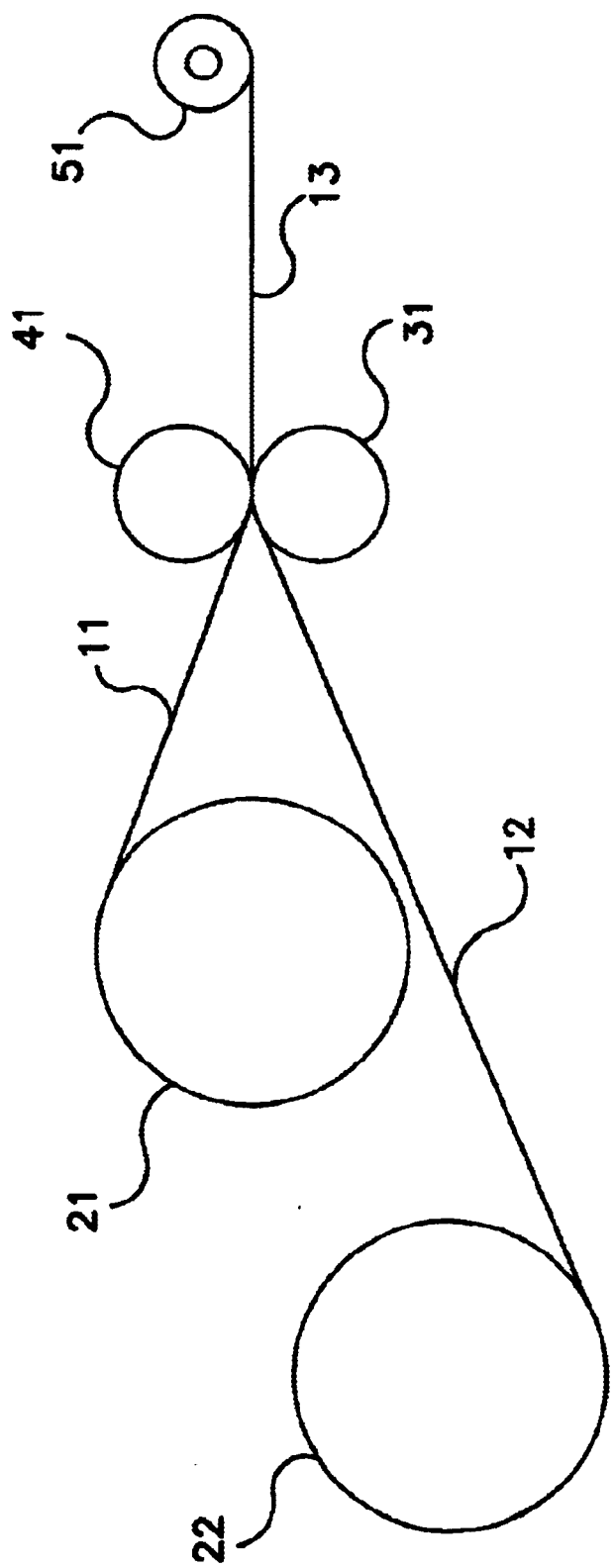
FIG. 3 is a schematic drawing of a prior art converting process wherein two webs are joined by embossing.

Two finished product prototypes were produced using the base sheet described above. The first of these prototypes employed emboss technology of the prior art, where two base sheets were plied together prior to embossing and both sheets are embossed using a single nip as shown in FIG. 3. The emboss pattern used is shown in FIG. 11. The emboss penetration was 0.080 inches. After embossing, the product was calendered using the feed rolls at a gap of 0.008 inches. The second of the prototypes employed the technology of the current invention in which the individual sheets are embossed separately prior to being plied together. In this case, one of the plies was embossed using the pattern shown in FIG. 11, with the other ply being embossed using the mirror image of the pattern shown in FIG. 11. This emboss pattern is shown in FIG. 12. Each of the sheets was embossed at a depth of 0.075 inches. The two sheets were plied together such that the protrusions resulting from embossing the sheets are placed to the inside of the product as shown in FIG. 7. The two plies were joined to each other using knurling wheels as shown in FIG. 4. After knurling, the tissue was calendered using the feed rolls, which were set at a gap of 0.007 inches.

The physical properties of the two tissue products are shown in Table 2. From the table, it can be seen that the product produced using the current invention has a lower friction deviation, a higher bulk density, and a higher sensory softness than does the product produced using the prior art. All of these changes are positive with respect to tissue performance.

TABLE 2

Finished Product Properties

| Technology | Basis Weight (lbs/ream) | Caliper (mils/8 sheets) | MD Tensile (grams/3 inches) | CD Tensile (grams/3 inches) | MD Stretch | CD Stretch % |
| --- | --- | --- | --- | --- | --- | --- |
| Prior Art | 21.9 | 86.1 | 989 | 402 | 13.3 | 7.6 |
| Current Invention | 22.2 | 84.1 | 874 | 334 | 13.4 | 7.5 |

| Technology | CD Wet Tensile (grams/3 inches) | Opacity (%) | Bulk Density (% gain) | Tensile Stiffness (grams/inch/% strain) | Friction Deviation | Sensory Softness |
| --- | --- | --- | --- | --- | --- | --- |
| Prior Art | 146 | 64.3 | 800 | 16.4 | 0.630 | 18.28 |
| Current Invention | 130 | 65.2 | 920 | 15.3 | 0.396 | 19.76 |

Example 2

Tissue base sheets were produced using two furnish blends. The first base sheet was made from a furnish consisting of 70% hardwood having a fiber length of 1.28 mm and a coarseness of 12.9 mg/100 m and 30% softwood which had a fiber length of 2.85 mm and a coarseness of 26.2 mg/100 m. The second base sheet was made from a furnish consisting of 70% hardwood having a fiber length of 0.85 mm and a coarseness of 9.6 mg/100 m and 30% softwood which had a fiber length of 2.98 mm and a coarseness of 16.0 mg/100 m. For both base sheets, refining of the entire furnish was used to control base sheet strength. The base sheets were creped using a fifteen-degree beveled creping blade at 20% crepe. Chemical additives that were applied to the furnish or to the formed and partially dewatered base sheets are shown in Table 3. Table 3 also shows the average base sheet physical properties for the sheets made from the two furnish blends.

TABLE 3

Base Sheet Additives and Physical Properties

| Base Sheet Number | Temporary Wet Strength Agent Added (lbs/ton) | Dry Strength Starch Added (lbs/ton) | Softener Sprayed onto Sheet while it was on the felt (lbs/ton) |
|---|---|---|---|
| 1 | 3.5 | 6.0 | 2.0 |
| 2 | 3.3–4.0 | 5.0 | 2.0 |

| Base Sheet Number | Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
|---|---|---|---|---|---|---|---|
| 1 | 9.2 | 27.2 | 547 | 234 | 13.7 | 6.1 | 32 |
| 2 | 9.0 | 25.8 | 544 | 229 | 16.5 | 5.9 | 20 |

Samples of the two base sheets were converted to three ply-products using two converting methods. In the first of these methods, that of the prior art, all three base sheet plies were passed together through the nip formed by the emboss roll and the rubber backup roll. The emboss pattern used is shown in FIG. 11. After embossing, the three-ply product was calendered using the feed rolls. For the products that were produced by the current invention, two of the base sheet plies were passed through one nip formed by an emboss roll and a rubber backup roll, with the emboss pattern being that shown in FIG. 11. The third ply was passed through a separate nip formed by an emboss roll and a rubber backup roll, with the FIG. 12 emboss pattern, which is the mirror image of the pattern shown in FIG. 11. The three plies were then joined together such that the protrusions produced by the emboss nips were placed to the inside of the three-ply product, as shown in FIG. 7. The piles were joined by passing the product through knurling wheels which were running against an anvil roll. After embossing and knurling, the product was calendered using the feed rolls. The embossing conditions for the two base sheets are shown in Table 4.

TABLE 4

Embossing Conditions for Three-Ply Tissue

| Base Sheet Number | Technology | Penetration (inches) | Feed Roll Gap |
|---|---|---|---|
| 1 | Prior Art | 0.110 | 0.004 |
| 1 | Current Invention | 2 Plies - 0.100<br>1 Ply - 0.090 | 0.003 |
| 2 | Prior Art | 0.110 | 0.005 |
| 2 | Current Invention | 2 Plies - 0.095<br>1 Ply - 0.085 | 0.005 |

The embossed three-ply products were tested for physical properties and sensory softness. The results of these tests are shown in Table 5. The table show that, for each base sheet, the product produced using the current invention has a lower friction deviation, a higher bulk density, and a higher sensory softness than does the product produced using the prior art. All of these changes are positive with respect to tissue performance.

TABLE 5

Physical Properties of Embossed Tissue Products

| Base Sheet # | Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|---|
| 1 | Prior Art | 26.7 | 98.2 | 936 | 338 | 7.5 | 8.1 |
| 1 | Current Invention | 27.0 | 97.8 | 1027 | 395 | 8.0 | 8.6 |
| 2 | Prior Art | 25.7 | 97.1 | 1068 | 353 | 10.5 | 8.2 |
| 2 | Current Invention | 26.2 | 98.2 | 1125 | 379 | 10.3 | 8.7 |

| Base Sheet # | Technology | CD Wet Tensile (grams/3 inches) | Opacity (%) | Bulk Density (% gain) | Tensile Stiffness (grams/inch/% strain) | Friction Deviation | Sensory Softness |
|---|---|---|---|---|---|---|---|
| 1 | Prior Art | 56 | 66.2 | 951 | 20.3 | 0.488 | 17.94 |
| 1 | Current Invention | 62 | 67.9 | 1027 | 22.5 | 0.371 | 18.54 |
| 2 | Prior Art | 92 | 69.4 | 978 | 18.1 | 0.513 | 19.22 |
| 2 | Current Invention | 95 | 70.3 | 1100 | 19.0 | 0.390 | 19.82 |

Example 3

Two-layer stratified base sheets were produced using different fibers on the outer-layer of the tissue sheet. The first of these sheets employed a top layer composed of a hardwood fiber having a fiber length of 1.33 mm. and a coarseness of 11.1 mg/100 m. This layer constituted 44% of the total sheet. This layer was stratified on top of a second layer that was composed of an 88/18 blend of softwood fiber and broke. The softwood fiber had a fiber length of 3.12 mm and a fiber coarseness of 17.8 mg/100 m. The total sheet had a fiber length of 2.23 mm and a coarseness of 13.6 mg/100 m. The base sheet was treated with a temporary wet strength additive at an addition level of 1.75 lbs/ton and a debonder at an addition level of 4.0 lbs/ton. Both of these chemicals were added to the stock prior to its being formed into a tissue sheet. An additional 0.5 lbs/ton of the debonder was sprayed onto the formed and partially dewatered sheet while it was on the felt. The second of the two stratified sheets had a top layer composed of a hardwood having a fiber length of 0.97 mm and a coarseness of 8.3 mg/100 m. This layer, which comprised 38% of the total sheet, was stratified over a second layer composed of an 84/16 blend of softwood and broke. The softwood fiber used in this second layer was the same as that used in the second layer of the first base sheet. The total sheet had a fiber length of 2.20 mm and a coarseness of 12.0 mg/100 m. Two and one-half pounds per ton of a temporary wet strength agent and one pound per ton of a debonder were added to the furnish prior to its formation into a tissue sheet. One-half of a pound per ton of the debonder was also sprayed onto the formed and partially dewatered sheet while it was on the felt. Both base sheets were slit into rolls in preparation for converting. The physical properties of the slit base sheets are shown in Table 6.

TABLE 6

Base Sheet Physical Properties

| Base Sheet Number | Basis Weight (lbs/ream) | Caliper (mils/8 sheets) | MD Tensile (gr/3") | CD Tensile (gr/3") | MD Stretch (%) | CD Stretch (%) |
|---|---|---|---|---|---|---|
| 1 | 13.74 | 40.5 | 564 | 338 | 28.6 | 6.8 |
| 2 | 13.52 | 42.0 | 626 | 360 | 29.4 | 6.4 |

The two base sheets were converted to two-ply finished products using the technology of the current invention. For both products, the base sheets were plied such that the outer hardwood layer was placed to the outside of the product. The emboss patterns used to produce products are shown in FIGS. 13 and 14. The two patterns are mirror images of each other. For both products, the emboss penetration depth was 0.120 inches for each base sheet. After embossing, the two base sheets were plied together and knurled to attach the two plies as is shown in FIG. 4. After embossing, the two-ply product was calendered using the feed rolls which were set at a gap of 0.006 inches. The physical properties and sensory softness of the two two-ply tissue products are shown in Table 7.

TABLE 7

Embossed Product Physical Properties

| Base Sheet Number | Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|---|
| 1 | Current Invention | 24.95 | 98.6 | 789 | 364 | 16.1 | 9.4 |
| 2 | Current Invention | 24.90 | 101.3 | 884 | 413 | 19.6 | 9.2 |

| | Technology | CD Wet Tensile (grams/3 inches) | Opacity (%) | Bulk Density (% gain) | Tensile Stiffness (grams/inch/% strain) | Friction Deviation | Sensory Softness |
|---|---|---|---|---|---|---|---|
| 1 | Current Invention | 56 | 66.7 | 1027 | 13.4 | 0.316 | 19.41 |
| 2 | Current Invention | 73 | 65.9 | 1054 | 13.3 | 0.341 | 19.38 |

It would be expected that the product produced using the second base sheet would be softer than the product made from the first base sheet, as the second product's outer layer has a lower coarseness than does the outer layer of the first product. However, as Table 7 shows, both products have similar softness values. This example demonstrates the ability of the current invention to produce products of high softness even when furnish blends containing high-coarseness fibers are used.

Example 4

To test consumer response to products of the current invention, the tissue product produced from base sheet number 1 in Example 3 was fielded in a Monadic Home Use Test (HUT). Monadic Home Use Tests are described in the Blumkenship and Green textbook "State of the Art Marketing Research", NTC Publishing Group, Lincolnwood, Ill., 1993. In this type of consumer test, consumers are given a single product to use for several days and are then asked to rate the product for overall performance as well as for several product attributes. Each attribute is assigned a rating of "Excellent", "Very Good", "Good", "Fair", or "Poor". For tabulation purposes, these ratings are assigned numerical values from 1 to 5, with 5 corresponding to an "Excellent" rating and 1 corresponding to a rating of "Poor". By totalling the rating scores given by all respondents and dividing by the number of respondents, an average attribute rating between 1 and 5 may be obtained.

Table 8 shows the results of the Monadic HUT for the product of the current invention. As a point of comparison, results from a high-weight, high-softness, store-shelf product made using the prior art are also included. This prior art product was composed of all low-coarseness fibers and had an overall coarseness of about 9.2.

TABLE 8

Monadic HUT Results

| Attribute | Prior Art Product Coarseness = about 9.2 mg/100 m | Current Invention Product Coarseness = 13.6 mg/100 m |
| --- | --- | --- |
| Overall Rating | 3.92 | 4.15 |
| Softness | 4.19 | 4.17 |
| Strength | 4.04 | 3.94 |
| Thickness | 3.89 | 3.84 |
| Absorbency | 4.03 | 4.00 |
| Roll Life | 3.25 | 3.39 |

The results of the Monadic Home Use Test show that the product of the current invention, although made from a relatively coarse fiber blend, is at parity for softness to the prior art product, which is composed of all low-coarseness fibers. The product of the current invention has a higher overall rating compared to the prior art product.

Example 5

For conventionally-embossed products produced using prior-art technology, the embossing process creates finished, embossed sheets that are quite different on the top and bottom of the product sheet with respect to texture and feel. The top of the sheet is the side of the product on the outside of the finished tissue roll, while the bottom of the sheet faces the inside of the roll. This difference results from the action of the emboss elements in the nip that create depressions on the side of the sheet that is against the hard emboss roll (the top) and corresponding protrusions on the side of the sheet that is against the softer rubber backing roll (the bottom) during the embossing process. This process results in a product with quite different surface characteristics on the top and bottom of the sheet. In addition, the protrusions on the bottom side of the sheet can detract from the perceived softness of the product. The product of the current invention, by contrast, eliminates the possibility of the protrusions detracting from the product's softness, as these features of the product are located on the inside of the finished product sheet where they are not contacted by the user. Also, the products of the current invention have a similar texture on both sides of the sheet, which results in both sides of the tissue feeling the same to the user.

Figure 15:
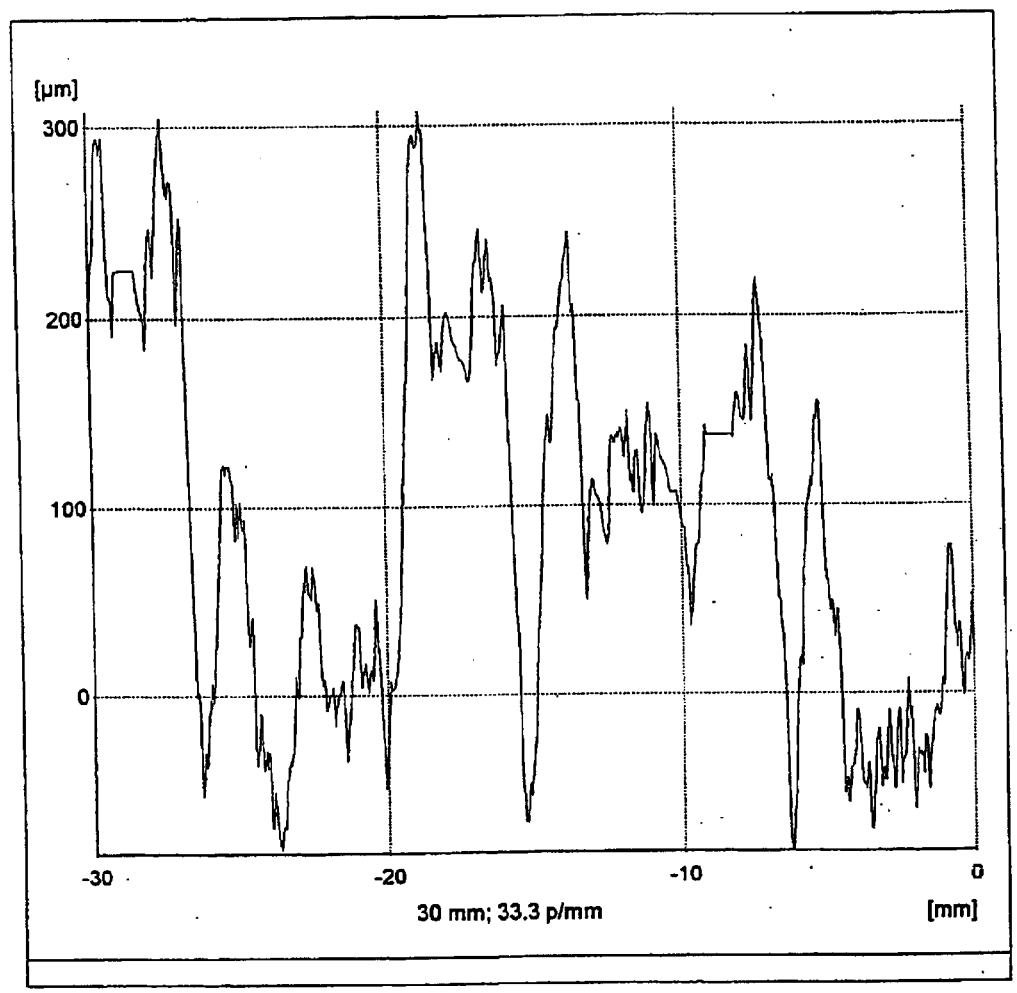
FIG. 15 illustrates an example profile from a laser profilometer.

To quantify the superiority of the products of the current invention with respect to having a similar texture on both sides of the embossed sheet, product samples made from the same base sheet but embossed using either the prior art technology or the process of the current invention, were measured using laser profilometry. The tissue of the prior art was embossed using the pattern shown in FIG. 11 with the method shown in FIG. 3. The product of the current invention had one side of the product embossed using the same pattern, while the other side was embossed using the pattern shown in FIG. 12, which is the mirror image of the pattern shown in FIG. 11 using the process shown in FIG. 4. The profilometer used in this test is the UBM Micro Focus Laser Profilometer type 2010, which is available from UBM Corp. Scans of both of the surfaces of each of the two products were taken, with the scans concentrating on the round emboss elements that make up the pattern's "quilted" background lattice. The top and bottom surfaces of each product were scanned using the profilometer to generate a surface profile. One example of such a profile is shown in FIG. 15. From this profile, a parameter known as the "ISO 10 Point Height" can be calculated. This measure of surface roughness or irregularity is defined as the arithmetic average of the 5 highest profile peaks and the 5 lowest profile valleys over the entire scan. Peaks and valleys are defined as profile sections between two consecutive intersections with the center line. These values were calculated for both sides of the products made using the two emboss technologies. The results of the test are shown in Table 9. As can be seen, there is little difference between the top and bottom of the product embossed using the current invention's technology. By contrast, the values for the top and bottom of the product embossed using the prior art are quite different, indicating a substantial difference in texture between the two sides of the product.

TABLE 9

Results of Surface Profilometry Testing - ISO 10 Point Height

| | Sheet Side | | |
| --- | --- | --- | --- |
| Technology | Top | Bottom | Absolute Difference |
| Prior Art | 237.2 | 166.9 | 70.3 |
| Current Invention | 150.8 | 160.0 | 9.2 |

Example 6

Tissue base sheets were produced from a furnish composed entirely of recycled fiber having a weight-weighted fiber length of 1.73 mm and a coarseness of 13.0 mg/100 m. The furnish was treated with 0.5 lbs/ton of a charge control agent (Bufloc 5031), and 0.5 lbs/ton of a retention aid (Bufloc 594). Five and one half lbs/ton of a cationic debonder was added to the furnish to control base sheet tensile strength. The sheets were creped from the Yankee dryer at a moisture content of 4% using a standard square (90°) crepe blade. The percent crepe was 20%. The base sheet was calendered on the paper machine prior to its being reeled into a parent roll. The average physical properties of the base sheet are shown in Table 9.

A second base sheet was produced from the same recycled furnish. The process conditions were the same as for the first base sheet with the following exceptions: the amount of cationic debonder added to the furnish was 5.0 lbs/ton and the sheet was creped from the Yankee dryer using a biaxially undulatory crepe blade. Biaxially undulatory crepe blades are described in U.S. Pat. No. 5,656,134. The undulatory crepe blade had 30 undulations per inch and an undulation depth of 0.010 inches. The average base-sheet physical properties for this sheet are also shown in Table 10.

TABLE 10

Base Sheet Physical Properties

| Base Sheet Number | Basis Weight (lbs/ream) | Caliper (mils/8 sheets) | MD Tensile (gr/3") | CD Tensile (gr/3") | MD Stretch (%) | CD Stretch (%) |
| --- | --- | --- | --- | --- | --- | --- |
| 1 | 11.18 | 31.8 | 714 | 304 | 20.6 | 5.6 |
| 2 | 11.22 | 37.2 | 683 | 286 | 19.8 | 8.7 |

Figure 16:
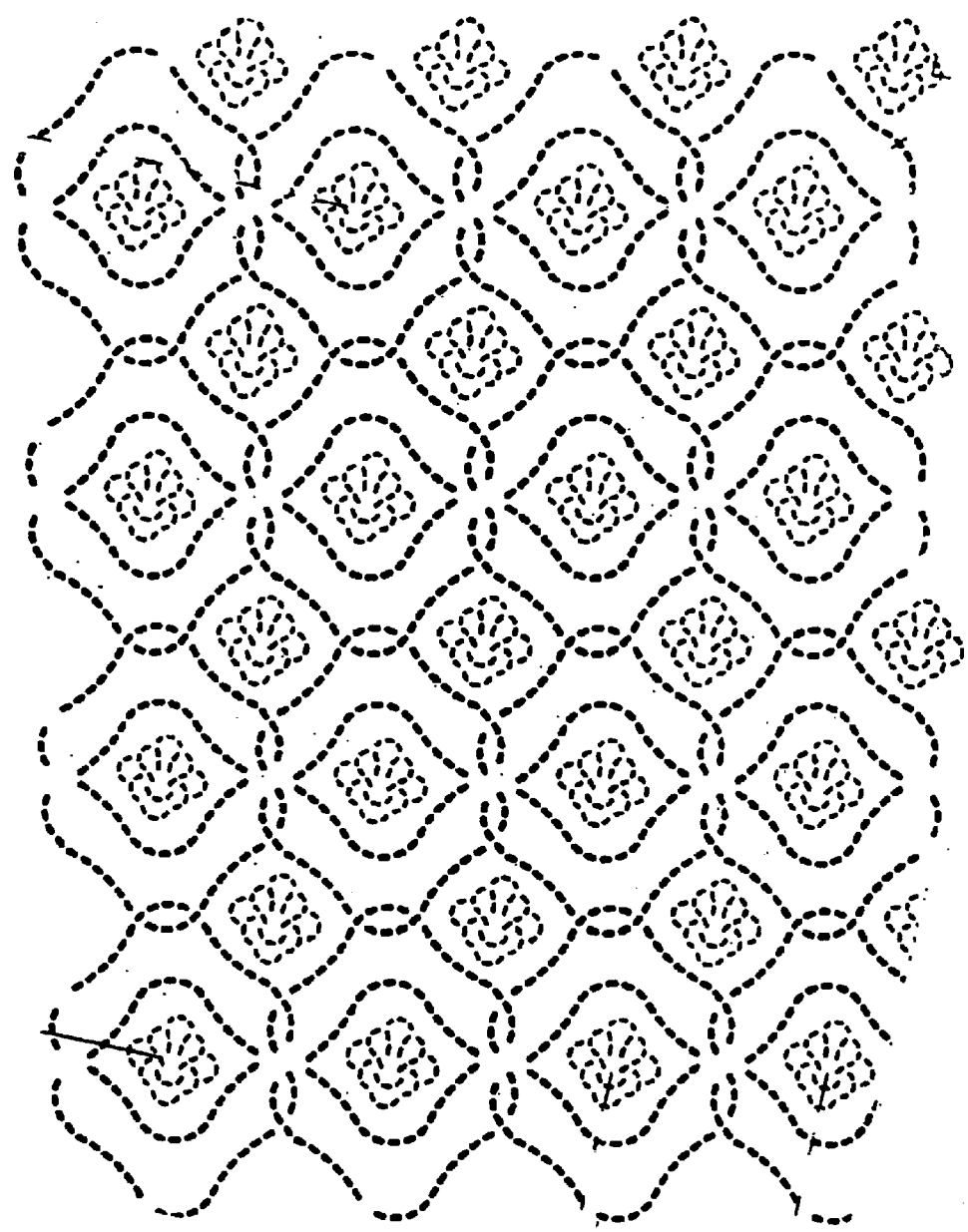
FIG. 16 illustrates an emboss pattern for use according to the present invention.

Pairs of both base sheets were converted to finished two-ply tissue products using both the prior art and the technology of the current invention. For the first base sheet, the two plies were joined together and embossed using the emboss pattern shown in FIG. 16 and the process shown in FIG. 3. The base sheets were embossed using an emboss penetration depth of 0.0975 inches. After embossing, the plied base sheets were calendered using feed rolls that were set at a gap of 0.011 inches. The embossed tissue was wound to produce a roll of 200 sheets.

This base sheet was also embossed using the technology of the current invention. In this case, only one of the plies was embossed. This ply was embossed using the emboss pattern shown in FIG. 16 at an emboss depth of 0.1025 inches. After it was embossed, this ply was joined to the other, unembossed ply to form a two-ply sheet. The two plies were joined together by knurling as shown in FIG. 5 and were calendered using feed rolls set at a gap of 0.010 inches.

A pair of base sheets made using the undulatory crepe blade were similarly embossed with the same emboss pattern, using both the prior art technology and the technology of the current invention. For the base sheets that were embossed using the prior art, the emboss penetration depth was 0.0925 inches and the feed rolls were set at a gap of 0.011 inches.

The base sheets were also embossed using the technology of the current invention. In this case, one of the plies was embossed at an emboss penetration depth of 0.100 inches, while the other ply was not embossed. The two plies were joined together by knurling and were calendered using feed rolls having a gap of 0.010 inches. Both the product of the prior art and that of the current invention were wound to rolls having 200 sheets. The physical properties of the embossed products are shown in Table 11. The table also shows the sensory softness of the products, which were determined by a trained panel.

statistically significant at the 95% confidence level. The caliper and bulk density of the products of the current invention were higher than the prior art counterparts. These are indications that the products of the current invention are superior.

Example 7

Tissue base sheets were formed from a furnish consisting of 70% hardwood having a fiber length of 1.32 mm and a coarseness of 12.6 mg/100 m and 30% softwood which had a fiber length of 3.58 mm and a coarseness of 24.4 mg/10 m. The combined furnish had a weight-weighted fiber length of 2.04 mm and a coarseness of 17.6 mg/100 m. Addition of a cationic debonder was used to control base sheet strength. The debonder addition level was 1.5 lbs/ton. Four and one-fourth pounds per ton of a temporary wet strength agent was added to the furnish. The sheet was creped using a 10-degree bevel creping blade at 24% crepe. The average base sheet physical properties are shown in Table 12.

TABLE 12

| Base Sheet Physical Properties | | | | | | |
| --- | --- | --- | --- | --- | --- | --- |
| Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
| 15.28 | 43.3 | 778 | 286 | 30.2 | 7.1 | 67 |

Two finished product prototypes were produced using the base sheet described above. The first of these prototypes employed emboss technology of the prior art, where two

TABLE 11

| Physical Properties of Embossed Tissue Products | | | | | | |
| --- | --- | --- | --- | --- | --- | --- |
| Base Sheet Number | Technology | Basis Weight (lbs/ream) | Caliper (mils/8 sheets) | MD Tensile (grams/3 inches) | CD Tensile (grams/3 inches) | MD Stretch (%) | CD Stretch (%) |
| 1 | Prior Art | 21.72 | 88.8 | 1025 | 373 | 13.0 | 8.9 |
| 1 | Current Invention | 22.75 | 90.1 | 923 | 396 | 12.6 | 5.9 |
| 2 | Prior Art | 21.57 | 87.4 | 1049 | 396 | 13.2 | 9.4 |
| 2 | Current Invention | 22.47 | 91.2 | 857 | 370 | 12.0 | 7.7 |

| Base Sheet Number | Technology | Perf Tensile (grams/3 inches) | Brightness (%) | Bulk Density (% gain) | Tensile Stiffness (grams/inch/% strain) | Friction Deviation | Sensory Softness |
| --- | --- | --- | --- | --- | --- | --- | --- |
| 1 | Prior Art | 460 | 73.6 | 859 | 15.2 | 0.501 | 16.23 |
| 1 | Current Invention | 510 | 73.3 | 890 | 26.7 | 0.852 | 16.86 |
| 2 | Prior Art | 478 | 73.7 | 883 | 15.6 | 0.618 | 16.26 |
| 2 | Current Invention | 522 | 73.2 | 971 | 22.6 | 0.778 | 16.88 |

Figure 17:
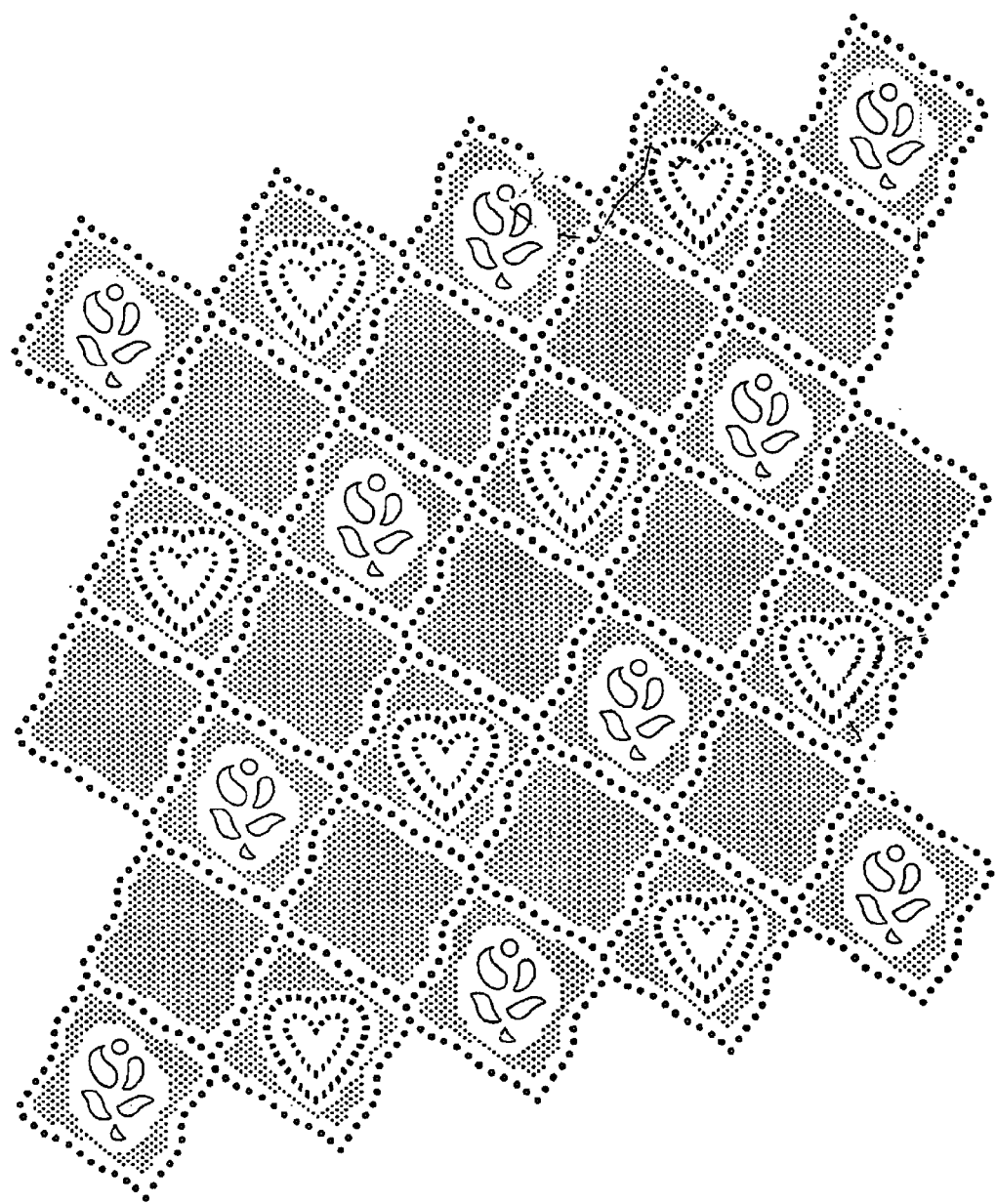
FIG. 17 illustrates a preferred emboss pattern for use according to the present invention similar to that shown in FIG. 13 except that higher elements are used. The pattern contains both macro or large elements and micro or very small background elements.

In both cases, the softness of the products produced using the technology of the current invention was higher than that made using the prior art. The differences in softness are base sheets were plied together prior to embossing and both sheets are embossed using a single nip as shown in FIG. 3. The emboss pattern used is shown in FIG. 17. The emboss penetration was 0.120 inches. After embossing, the product was calendered using the feed rolls at a gap of 0.009 inches. The second of the prototypes employed the technology of the current invention. In this case, one of the plies was embossed with the pattern shown in FIG. 17 at an emboss penetration depth of 0.130 inches, while the other ply was not embossed. The two plies were joined together by knurling as shown in FIG. 5 and were calendered using feed rolls having a gap of 0.009 inches.

The physical properties of the two tissue products are shown in Table 13. From the table, it can be seen that the product produced using the current invention has a higher sensory softness than does the product produced according to the prior art. Also, the product of the current invention has higher caliper, higher bulk density and much lower friction. These are all indications of the product of the current invention being superior to the product made according to the prior art.

sheet strength. The debonder addition level was 0.25 lbs/ton. Four and one-fourth pounds per ton of a temporary wet strength agent was added to the furnish. The sheet was creped using a 10-degree bevel creping blade at 24% crepe. The average base sheet physical properties are shown in Table 14.

TABLE 14

Base Sheet Physical Properties

| Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
|---|---|---|---|---|---|---|
| 15.44 | 46.8 | 804 | 270 | 35.0 | 8.2 | 90 |

An embossed prototype, employing the technology of the current invention, was produced from the base sheet. One of the plies was embossed at an emboss penetration depth of 0.130 inches using the emboss pattern shown in FIG. 17, while the other ply was not embossed. The two plies were joined together by knurling as shown in FIG. 5 and were calendered using feed rolls having a gap of 0.009 inches.

The physical properties of the tissue prototype are shown in Table 15. The product has good wet and dry strength, good thickness, and high softness.

TABLE 13

Finished Product Properties

| Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|
| Prior Art | 29.1 | 108.1 | 1362 | 417 | 20.0 | 8.1 |
| Current Invention | 29.1 | 109.0 | 800 | 376 | 13.0 | 6.7 |

| Technology | CD Wet Tensile (grams/3 inches) | Perf Tensile (grams/3 inches) | Bulk Density (% gain) | Tensile Stiffness (grams/ inch % strain) | Friction Deviation | Sensory Softness |
|---|---|---|---|---|---|---|
| Prior Art | 107 | 604 | 808 | 16.2 | 0.723 | 16.6 |
| Current Invention | 101 | 505 | 885 | 20.9 | 0.569 | 18.0 |

Example 8

Tissue base sheets were formed from a furnish consisting of 65% hardwood having a fiber length of 0.86 mm and a coarseness of 7.9 mg/100 m and 35% softwood which had a fiber length of 2.98 mm and a coarseness of 16.0 mg/10 m. The combined papermaking furnish had a weight-weighted fiber length of 1.89 mm and a coarseness of 12.7 mg/1000 m. Addition of a cationic debonder was used to control base

TABLE 15

Finished Product Properties

| Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|
| Current Invention | 28.4 | 108.2 | 917 | 365 | 19.8 | 7.3 |

| Technology | CD Wet Tensile (grams/3 inches) | Perf Tensile (grams/3 inches) | Bulk Density (% gain) | Tensile Stiffness (grams/ inch % strain) | Friction Deviation | Sensory Softness |
|---|---|---|---|---|---|---|
| Current Invention | 134 | 547 | — | 18.0 | 0.538 | 19.5 |

Example 9

Tissue base sheets were formed from a furnish consisting of 65% hardwood having a fiber length of 0.86 mm and a coarseness of 7.9 mg/100 m and 35% softwood which had a fiber length of 2.98 mm and a coarseness of 16.0 mg/100 m. The combined papermaking furnish had a weight-weighted fiber length of 1.71 mm and a coarseness of 8.5 mg/100 m. A low amount of refining was used to increase the strength of the base sheet. Four and one-half pounds per ton of a temporary wet strength agent was added to the furnish. The sheet was creped using a 10-degree bevel creping blade at 21% crepe. The average base sheet physical properties are shown in Table 16.

TABLE 16

Base Sheet Physical Properties

| Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
|---|---|---|---|---|---|---|
| 11.5 | 38.3 | 709 | 295 | 32.5 | 7 | 57 |

Two finished product prototypes were produced using the base sheet described above. The first of these prototypes employed emboss technology of the prior art, where two base sheets were plied together prior to embossing and both sheets are embossed using a single nip as shown in FIG. 3. The emboss pattern used is shown in FIG. 11. The emboss penetration was 0.100 inches. After embossing, the product was calendered using the feed rolls at a gap of 0.010 inches. The second of the prototypes employed the technology of the current invention. In this case, one of the plies was embossed using the emboss pattern shown in FIG. 17 at an emboss penetration depth of 0.120 inches, while the other ply was not embossed. The two plies were joined together by knurling as shown in FIG. 5 and were calendered using feed rolls having a gap of 0.010 inches.

The physical properties of the two tissue products are shown in Table 17. From the table, it can be seen that the product produced using the current invention has a higher sensory softness than does the product produced using the prior art. Also the product of the current invention has higher caliper, higher CD tensile, higher CD wet tensile, lower friction and higher Bulk Density. These are all indications of the product of the current invention being superior to the product made with the prior art.

TABLE 17

Finished Product Properties

| Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|
| Prior Art | 21.9 | 97.6 | 1043 | 336 | 19.4 | 9.5 |
| Current Invention | 21.8 | 99.8 | 710 | 395 | 14.5 | 7.0 |

| Technology | CD Wet Tensile (grams/3 inches) | Perf Tensile (grams/3 inches) | Bulk Density (% gain) | Tensile Stiffness (grams/inch/% strain) | Friction Deviation | Sensory Softness |
|---|---|---|---|---|---|---|
| Prior Art | 69.4 | 435 | 989 | 10.8 | 0.655 | 17.6 |
| Current Invention | 85.7 | 386 | 1188 | 18.8 | 0.470 | 18.4 |

Example 10

Tissue base sheets were formed from a furnish consisting of 70% hardwood having a fiber length of 1.32 mm and a coarseness of 12.6 mg/100 m and 30% softwood which had a fiber length of 3.58 mm and a coarseness of 24.4 mg/100 m. The combined furnish had a weight-weighted fiber length of 1.96 mm and a coarseness of 13.2 mg/100 m. A low amount of refining was used to increase the strength of the base sheet. Five and one-fourth pounds per ton of a temporary wet strength agent was added to the furnish. The sheet was creped using a 10-degree bevel creping blade at 21% crepe. The average base sheet physical properties are shown in Table 18.

TABLE 18

Base Sheet Physical Properties

| Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
|---|---|---|---|---|---|---|
| 11.5 | 38.4 | 777 | 320 | 26.5 | 6.7 | 58.8 |

Two finished product prototypes were produced using the base sheet described above. The first of these prototypes employed emboss technology of the prior art, where two base sheets were plied together prior to embossing and both sheets are embossed using a single nip as shown in FIG. 3. The emboss pattern used is shown in FIG. 11. The emboss penetration was 0.095 inches. After embossing, the product was calendered using the feed rolls at a gap of 0.009 inches. The second of the prototypes employed the technology of the current invention. In this case, one of the plies was embossed using the emboss pattern shown in FIG. 17 at an emboss penetration depth of 0.120 inches, while the other ply was not embossed. The two plies were joined together by knurling as shown in FIG. 5 and were calendered using feed rolls having a gap of 0.009 inches.

The physical properties of the two tissue products are shown in Table 19. From the table, it can be seen that the product produced using the current invention has a higher sensory softness than does the product produced using the prior art. Also the product of the current invention has higher caliper, higher CD tensile, higher CD wet tensile, higher bulk density and lower friction. These are all indications of the product of the current invention being superior to the product made with the prior art.

TABLE 19

Finished Product Properties

| Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|
| Prior Art | 22.3 | 97.2 | 1176 | 395 | 18.7 | 9.4 |
| Current Invention | 22.4 | 103.5 | 896 | 435 | 19.3 | 6.5 |

| Technology | CD Wet Tensile (gram/3 inches) | Perf Tensile (grams/3 inches) | Bulk Density (% gain) | Tensile Stiffness (grams/inch/% strain) | Friction Deviation | Sensory Softness |
|---|---|---|---|---|---|---|
| PriorArt | 73.7 | 481 | 912 | 14.2 | 0.661 | 16.4 |
| Current Invention | 86.8 | 460 | 925 | 23.4 | 0.532 | 17.0 |

Example 11

Two tissue base sheets were formed at two levels of basis weight from a furnish consisting of 65% hardwood having a fiber length of 0.86 mm and a coarseness of 7.9 mg/100 m and 35% softwood which had a fiber length of 2.98 mm and a coarseness of 16.0 mg/100 m. The combined papermaking furnish for the heavier base sheet had a weight-weighted fiber length of 1.71 mm and a coarseness of 8.5 mg/100 m. The combined papermaking furnish for the lighter base sheet had a weight-weighted fiber length of 1.73 mm and a coarseness of 8.4 mg/100 m. The heavier base sheet was made with a low amount of refining to increase it's strength. Four and one-half pounds per ton of a temporary wet strength agent was added to the furnish. The lighter base sheet was made with a low amount of refining to increase the strength of the base sheet. Four and one-half pounds per ton of a temporary wet strength agent was added to the furnish. Both base sheets were creped using a 10-degree bevel creping blade at 21% crepe. The average base sheet physical properties are shown in Table 20.

Two finished product prototypes were produced using the two base sheets described above. The first of these prototypes employed emboss technology of the prior art, where two of the heavier base sheets were plied together prior to embossing and both sheets are embossed using a single nip as shown in FIG. 3. The emboss pattern used is shown in FIG. 11. The emboss penetration was 0.100 inches. After embossing, the product was calendered using the feed rolls at a gap of 0.010 inches. The second of the prototypes employed the technology of the current invention and the lighter base sheet. In this case, one of the plies was embossed using the emboss pattern shown in FIG. 17 at an emboss penetration depth of 0.120 inches, while the other ply was not embossed. The two plies were joined together by knurling as shown in FIG. 5 and were calendered using feed rolls having a gap of 0.011 inches.

The physical properties of the two tissue products are shown in Table 21. From the table, it can be seen that the lighter product produced using the current invention has a higher sensory softness than does the heavier product produced using the prior art. Also the product of the current invention has higher caliper, higher CD tensile, higher CD wet tensile, lower friction and higher Bulk Density. These are all indications of the product of the current invention being superior to the product made with the prior art even at 8.7% lower basis weight.

TABLE 20

Base Sheet Properties

| Base Sheet | Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
|---|---|---|---|---|---|---|---|
| HEAVIER | 11.5 | 38.3 | 709 | 295 | 32.5 | 7.0 | 57 |
| LIGHTER | 10.4 | 34.4 | 756 | 318 | 29.3 | 7.3 | 48 |

TABLE 21

Finished Product Properties

| Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|
| Prior Art heavier product | 21.9 | 97.6 | 1043 | 336 | 19.4 | 9.5 |
| Current Invention lighter product | 20 | 99.4 | 814 | 428 | 18.6 | 6.8 |

| Technology | CD Wet Tensile (gram/3 inches) | Perf Tensile (grams/3 inches) | Bulk Density (% gain) | Tensile Stiffness (grams/inch/% strain) | Friction Deviation | Sensory Softness |
|---|---|---|---|---|---|---|
| Prior Art heavier product | 69.4 | 435 | 989 | 10.8 | 0.655 | 17.6 |
| Current Invention lighter product | 82.9 | 468 | 1141 | 21.7 | 0.519 | 17.8 |

Example 12

Two tissue base sheets were formed at two levels of basis weight from a furnish consisting of 70% hardwood having a fiber length of 1.32 mm and a coarseness of 12.6 mg/100 m and 30% softwood which had a fiber length of 3.58 mm and a coarseness of 24.4 mg/100 m. The combined furnish for the heavier base sheet had a weight-weighted fiber length of 1.96 mm and a coarseness of 13.2 mg/100 m. The combined furnish for the lighter base sheet had a weight-weighted fiber length of 1.86 mm and a coarseness of 13.1 mg/100 m. The heavier base sheet was made with a low amount of refining to increase the strength of the base sheet. Five and one-quarter pounds per ton of a temporary wet strength agent was added to the furnish. The lighter base sheet was made with a low amount of refining to increase the strength of the base sheet. Six and one-quarter pounds per ton of a temporary wet strength agent was added to the furnish. Both base sheets were creped using a 10-degree bevel creping blade at 21% crepe. The average base sheet physical properties are shown in Table 22.

TABLE 22

Base Sheet Properties

| Base Sheet | Basis Weight (lbs/ream) | Caliper (mils/8 sheets) | MD Tensile (gr/3") | CD Tensile (gr/3") | MD Stretch (%) | CD Stretch (%) | CD Wet Tensile (gr/3") |
|---|---|---|---|---|---|---|---|
| HEAVIER | 11.5 | 38.4 | 777 | 320 | 26.5 | 6.7 | 58.8 |
| LIGHTER | 10.8 | 34 | 740 | 310 | 24.0 | 6.6 | 65.3 |

Two finished product prototypes were produced using the two base sheets described above. The first of these prototypes employed emboss technology of the prior art, where two of the heavier base sheets were plied together prior to embossing and both sheets are embossed using a single nip as shown in FIG. 3. The emboss pattern used is shown in FIG. 11. The emboss penetration was 0.095 inches. After embossing, the product was calendered using the feed rolls at a gap of 0.009 inches. The second of the prototypes employed the technology of the current invention and the lighter base sheet. In this case, one of the lighter plies was embossed using the emboss pattern shown in FIG. 17 at an emboss penetration depth of 0.120 inches, while the other ply was not embossed. The two lighter plies were joined together by knurling as shown in FIG. 5 and were calendered using feed rolls having a gap of 0.009 inches.

The physical properties of the two tissue products are shown in Table 23. From the table, it can be seen that the lighter product produced using the current invention has a higher sensory softness than does the heavier product produced using the prior art. Also, the product of the current invention has higher CD tensile, higher CD wet tensile, lower friction and higher Bulk Density. These are all indications of the product of the current invention being superior to the product made with the prior art even at 5.8% lower basis weight.

TABLE 23

Finished Product Properties

| Technology | Basis Weight (lbs/ream) | Caliper (mils/8 sheets) | MD Tensile (grams/3 inches) | CD Tensile (grams/3 inches) | MD Stretch (%) | CD Stretch (%) |
|---|---|---|---|---|---|---|
| Prior Art heavier product | 22.3 | 97.2 | 1176 | 395 | 18.7 | 9.4 |
| Current Invention lighter product | 21.0 | 96.7 | 882 | 422 | 13.2 | 6.4 |

| Technology | CD Wet Tensile (gram/3 inches) | Perf Tensile (grams/3 inches) | Bulk Density (% gain) | Tensile Stiffness (grams/inch/% strain) | Friction Deviation | Sensory Softness |
|---|---|---|---|---|---|---|
| Prior Art heavier product | 73.7 | 481 | 912 | 14.2 | 0.661 | 16.4 |
| Current Invention lighter product | 99.4 | 499 | 930 | 25.1 | 0.599 | 16.9 |

Example 13

A two-layer stratified base sheet was produced. The top layer was composed of a hardwood fiber. This layer comprised 45% of the total sheet. This layer was stratified on top of a second layer that was composed of 63% softwood and 37% hardwood. The base sheet was treated with a temporary wet strength additive at an addition level of 1.8 lbs/ton and a debonder at an addition level of 3.8 lbs/ton. Both of these chemicals were added to the stock prior to its being formed into a tissue sheet. An additional 1.5 lbs/ton of the debonder was sprayed onto the formed and partially dewatered sheet while it was on the felt.

Prototypes A through D were made by embossing the aforementioned base sheet with prior art technology and technology of the current invention. Column 2 of Table 24 describes how the prototypes were embossed.

The stack height test method was used to generate the stack height and spring back data set forth in Table 24 and FIG. 20. A napkin stack height gauge was used to record data using a sample of 150 sheets. The measuring platen was lifted and the sample placed into the gauge. The height of the sample was measured prior to compression to record the initial height. The weighted platen was then lowered so that it came to rest gently on the top of the sample by its own weight. After one minute the height of the sample was measured to record the height under load. The platen was then removed from the top of the sample and after one minute the sample height was measured to record the spring back height.

A tissue that has less % compression will be perceived as bulkier. However, to feel soft, the tissue must have resiliency and spring back after a load is removed. Furthermore, for enhanced absorbency and softness the bulk of the product should not come solely from corrugating the product in embossing, but should also have a less dense base structure. A higher bulk density gain indicates a less dense structure.

Table 24 and FIG. 20 show that prototype C produced using the prior art has much higher compression than the products of the current invention. Also, percent spring back for the prototypes made using the current invention are close to or higher than the percent spring back for prototype C. Also, the bulk density is significantly higher for each of the prototypes made with the current invention. All of these results indicate that the prototypes made with the same base sheet and the current invention would be perceived as bulkier, softer and more absorbent than the prototype made with the prior art.

TABLE 24

Stack Height (150 sheets) Spring back Test

| Prototype | Technology/ Pattern | Initial Height (mm) | Height Under Load (mm) | Spring back Height (mm) | Spring back % of Original | Compressed % | Bulk Density (% gain) |
|---|---|---|---|---|---|---|---|
| A | FIG. 5/FIG. 11 current invention | 87 | 68 | 81 | 93.1 | 21.8 | 902 |

TABLE 24-continued

Stack Height (150 sheets) Spring back Test

| Prototype | Technology/ Pattern | Initial Height (mm) | Height Under Load (mm) | Spring back Height (mm) | Spring back % of Original | Compressed % | Bulk Density (% gain) |
|---|---|---|---|---|---|---|---|
| B | FIG. 4/FIG. 17 current invention | 94 | 69 | 84 | 89.4 | 26.6 | 927 |
| C | FIG. 3/FIG. 11 prior art | 115 | 75 | 105 | 91.3 | 34.8 | 824 |
| D | FIG. 5/FIG. 17 current invention | 90 | 69 | 86 | 95.6 | 23.3 | 895 |

Example 14

Specific preferred embodiments of the present invention are illustrated and contrasted to the prior art in the following charts. Friction, sidedness, and tensile values were calculated according to the formulas noted above.

Products of the current invention have a combination of attributes important to premium tissues including high thickness, low sidedness, and high softness. One of the methods for improving the thickness of a tissue product is by embossing. However, in products of the prior art, increased levels of embossing tended to result in products that had higher values of sidedness, which resulted from the projections corresponding to the emboss elements that protruded from one side of the tissue product. In the current invention, it has been possible to produce a product having low sidedness by marrying a first embossed ply with a second ply that may or may not have been embossed, as illustrated in FIGS. 4 and 5 respectively. These methods of embossing allow the projections created in the embossed ply or plies to be located on the inside of the tissue, where they do not come in contact with the user. For products of the current invention, the overall sidedness of the multi-ply structure is less than about 0.6. This embossed ply will have been embossed with an emboss pattern having an embossed area of at least about 2%, preferably at least about 4%, more preferably at least about 8%, and the level of embossing will have been to the extent that the first embossed ply has a sidedness of at least 0.45. Emboss patterns having higher embossed areas are preferred as they provide a more uniform treatment of the base sheet and are useful in increasing the product's bulk density by opening up the structure. Accordingly, patterns containing both signature and micro elements, which tend to have higher levels of embossed area are preferred over patterns than contain only signature elements. The softness of the product of the current invention is maintained not only by its low sidedness, but also by controlling the tensile strength of the finished product, as it is well known that softness and strength are inversely related. Accordingly, products of the current invention will have a geometric mean tensile strength of no more than 800 grams/3 inches.

In Table 25, the properties of several prior art products, as well as those of products of the current invention are listed. The table shows the TMI friction deviations and sidedness values measured for each of the two plies of the tissue product as well as the friction deviation and sidedness of the combined two-ply tissue product. In the table, the friction deviation and sidedness values designated A/D refer to those measured for the composite product, while those designated A/B and C/D refer to the values measured for the individual plies. The values designated A/B are those measured for the product's top or outer ply, while those designated C/D are those measured for the bottom or inner ply. FIGS. 21 and 22 graphically represent the data in Table 25.

Products of the current invention include Tissues 2, 3, 4, 7, 8, and 9. As can be seen from the table, all of these products have overall (A/D) sidedness values of less than 0.6, while the sidedness of the embossed ply (A/B) is at least 0.45 (for product 2, both plies are embossed). Prior art Tissues 1, 5, 10, 11, 15, and 16 were embossed by the method illustrated in FIG. 3 in which both plies are joined prior to or at the emboss nip and are embossed together. Prior art Tissues 12, 13, and 14, while meeting the criteria of having an overall sidedness of less than 0.6 and an embossed ply sidedness of at least 0.45, have geometric tensile values of greater than 800 grams/3 inches. Finally, prior art Tissue 6, which meets both the sidedness and strength criteria set out above is excluded from the current invention as neither of its plies are embossed.

The TAD Super Premium 2-Ply (Tissue 6) was presumably fabricated from two identical sheets but when measured for surface friction slightly different values are obtained. This was due to the need for separating the multi-ply glued sheets of the product in order to obtain measurements for the individual sheets. The slight difference in values is believed to be a result of the residual glue that was measured on the resultant surface.

TABLE 25

| | | Top/Bottom Surfaces | MD Top S1 | MD Top S2 | CD Top S1 | CD Top S2 | GM Top | | MD Bot S1 | MD Bot S2 | CD Bot S1 | CD Bot S2 | GM Bot | | GM Friction | GM Sidedness | GM Tensile Modulus | GM Tensile |
|---|---|---|---|---|---|---|---|---|---|---|---|---|---|---|---|---|---|---|
| FIG. 11/FIG. 3 Prior Art | Tissue 1 | A/D | 0.68 | 0.50 | 0.70 | 0.65 | 0.63 | A | 0.81 | 0.66 | 0.67 | 0.61 | 0.66 | D | 0.64 | 0.67 | 11.9 | 538 |
| | Embossed Top Ply | A/B | 0.54 | 0.51 | 0.77 | 0.52 | 0.58 | A | 0.86 | 0.68 | 0.71 | 0.52 | 0.68 | B | 0.63 | 0.74 | | |
| | Embossed Bottom Ply | C/D | 0.57 | 0.44 | 0.68 | 0.53 | 0.55 | C | 0.56 | 0.50 | 0.83 | 0.58 | 0.61 | D | 0.58 | 0.64 | | |
| FIG. 17/FIG. 4 Current Invention | Tissue 2 | A/D | 0.43 | 0.42 | 0.31 | 0.28 | 0.35 | A | 0.56 | 0.57 | 0.29 | 0.28 | 0.40 | D | 0.38 | 0.43 | 13.1 | 536 |
| | Embossed Top Ply | A/B | 0.38 | 0.36 | 0.32 | 0.31 | 0.34 | A | 0.41 | 0.41 | 0.69 | 0.68 | 0.53 | B | 0.44 | 0.68 | | |
| | Embossed Bottom Ply | C/D | 0.66 | 0.57 | 0.49 | 0.42 | 0.52 | C | 0.48 | 0.46 | 0.60 | 0.51 | 0.51 | D | 0.52 | 0.53 | | |
| FIG. 17/FIG. 5 Current Invention | Tissue 3 | A/D | 0.35 | 0.32 | 0.43 | 0.39 | 0.37 | A | 0.55 | 0.53 | 0.32 | 0.30 | 0.41 | D | 0.39 | 0.43 | 21.4 | 559 |
| | Embossed Top Ply | A/B | 0.49 | 0.48 | 0.37 | 0.38 | 0.42 | A | 0.79 | 0.72 | 0.78 | 0.64 | 0.73 | B | 0.58 | 0.99 | | |
| | Flat Sheet Bottom Ply | C/D | 0.42 | 0.41 | 0.36 | 0.33 | 0.38 | C | 0.50 | 0.48 | 0.29 | 0.24 | 0.36 | D | 0.37 | 0.38 | | |
| FIG. 17/FIG. 5 Current Invention | Tissue 4 | A/D | 0.53 | 0.39 | 0.83 | 0.51 | 0.54 | A | 0.62 | 0.58 | 0.51 | 0.44 | 0.53 | D | 0.54 | 0.55 | 18.3 | 485 |
| | Embossed Top Ply | A/B | 0.78 | 0.57 | 0.76 | 0.56 | 0.66 | A | 0.79 | 0.49 | 1.12 | 0.77 | 0.76 | B | 0.71 | 0.82 | | |
| | Flat Sheet Bottom Ply | C/D | 0.48 | 0.45 | 0.34 | 0.32 | 0.39 | C | 0.49 | 0.50 | 0.35 | 0.32 | 0.41 | D | 0.40 | 0.42 | | |
| FIG. 11/FIG. 3 Prior Art | Tissue 5 | A/D | 0.67 | 0.63 | 0.58 | 0.40 | 0.54 | A | 0.83 | 0.71 | 0.64 | 0.46 | 0.64 | D | 0.59 | 0.71 | 20.0 | 605 |
| | Embossed Top Ply | A/B | 0.68 | 0.45 | 0.45 | 0.34 | 0.47 | A | 0.61 | 0.49 | 0.42 | 0.31 | 0.45 | B | 0.46 | 0.48 | | |
| | Embossed Bottom Ply | C/D | 0.67 | 0.52 | 0.41 | 0.29 | 0.45 | C | 0.73 | 0.47 | 0.51 | 0.33 | 0.49 | D | 0.47 | 0.51 | | |

TABLE 25-continued

Figure 18:
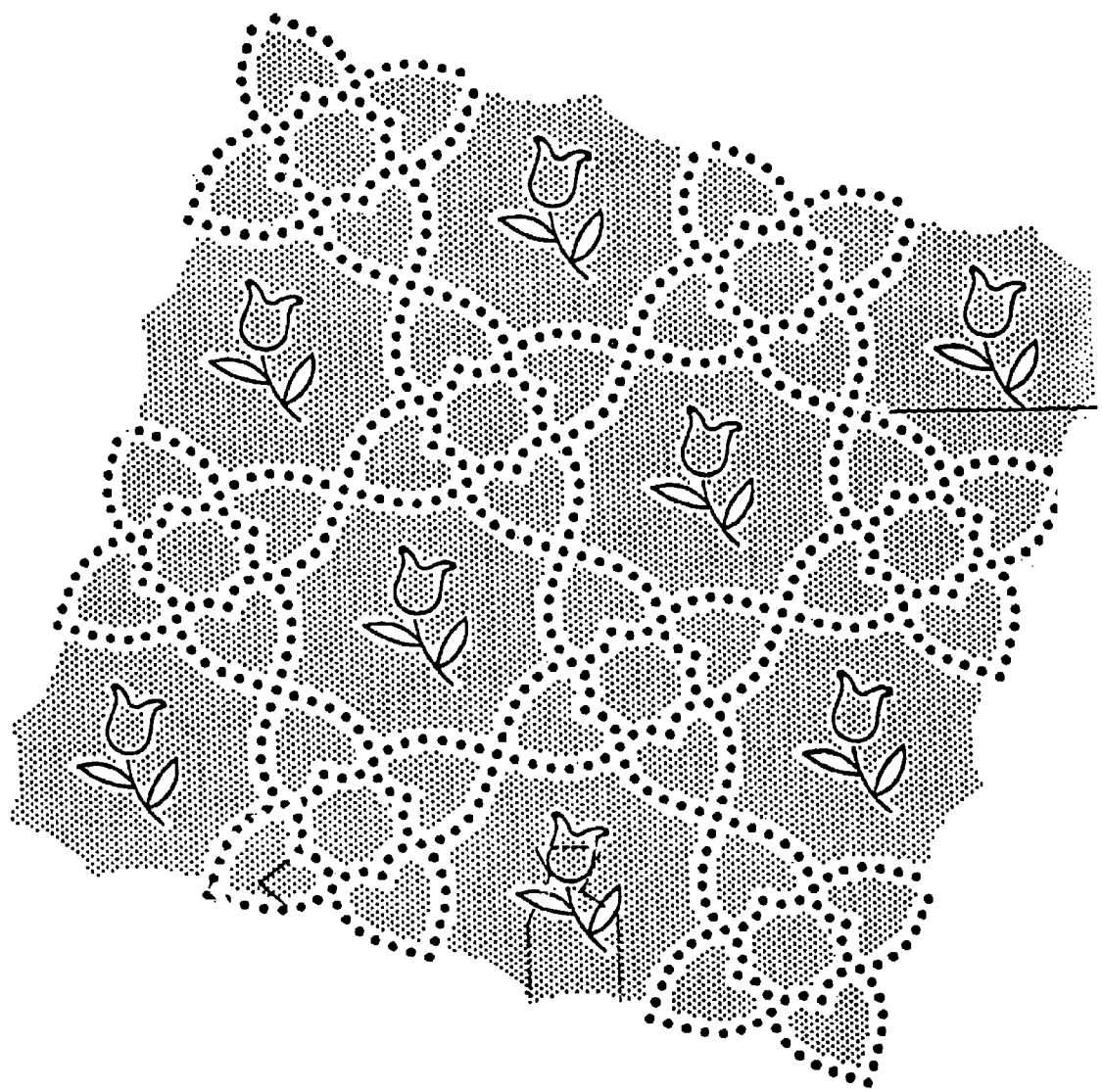
FIG. 18 illustrates a preferred emboss pattern for use according to the present invention for higher sheet count product format.
Figure 19:
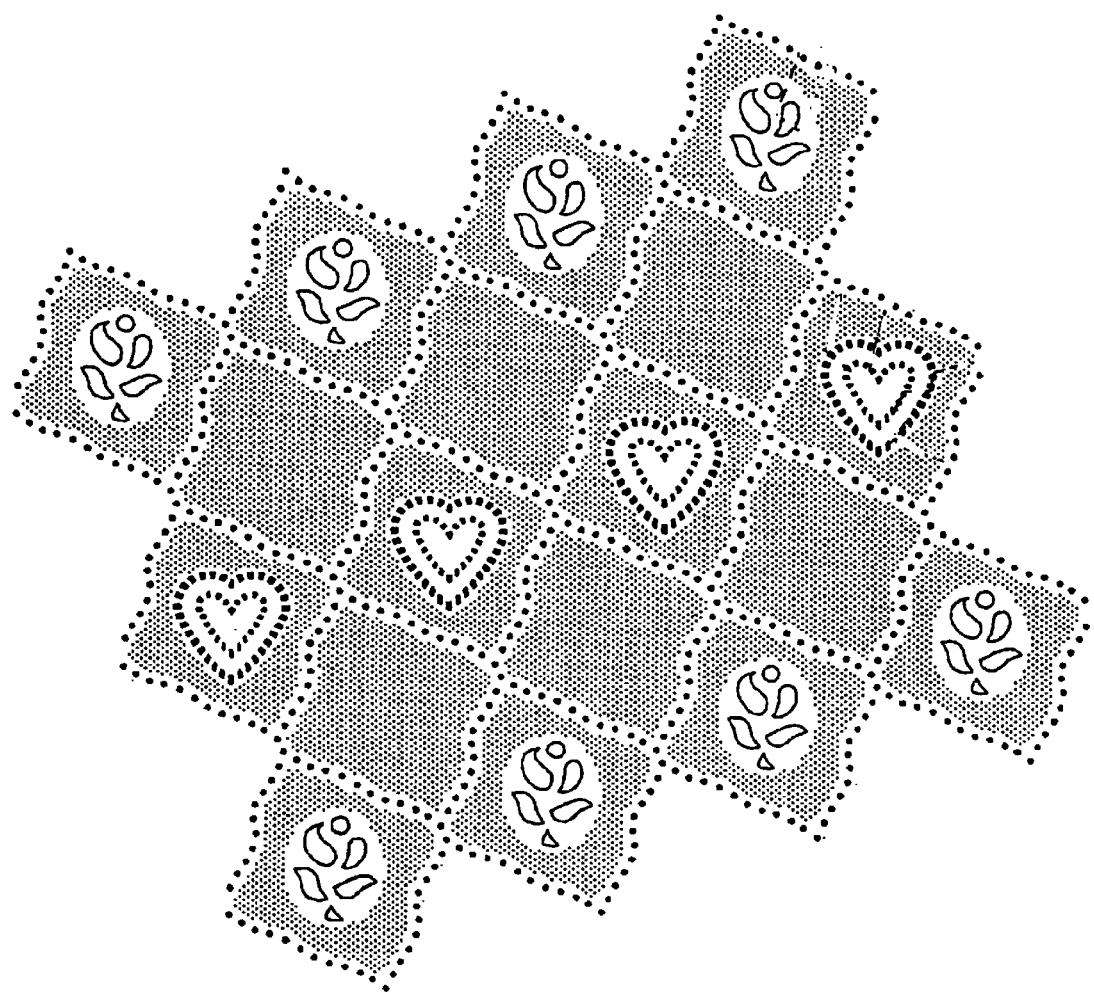
FIG. 19 illustrates another preferred emboss pattern for use according to the present invention.

| | | | | | | | | | | | | | | | | | | |
|---|---|---|---|---|---|---|---|---|---|---|---|---|---|---|---|---|---|---|
| Prior Art - TAD Super Premium | Tissue 6 | A/D | 0.30 | 0.29 | 0.30 | 0.28 | 0.29 | A | 0.32 | 0.35 | 0.28 | 0.29 | 0.31 | D | 0.30 | 0.32 | 14.6 | 652 |
| | PM Fabric Marked Top Ply | A/B | 0.32 | 0.30 | 0.25 | 0.24 | 0.27 | A | 0.52 | 0.53 | 0.48 | 0.44 | 0.49 | B | 0.38 | 0.68 | | |
| | PM Fabric Marked Bottom Ply | C/D | 0.51 | 0.48 | 0.40 | 0.45 | 0.46 | C | 0.27 | 0.27 | 0.26 | 0.27 | 0.27 | D | 0.36 | 0.62 | | |
| FIG. 18/FIG. 5 Current Invention | Tissue 7 | A/D | 0.37 | 0.35 | 0.26 | 0.25 | 0.30 | A | 0.44 | 0.44 | 0.27 | 0.27 | 0.35 | D | 0.33 | 0.37 | 21.6 | 557 |
| | Embossed Top Ply | A/B | 0.39 | 0.41 | 0.36 | 0.33 | 0.37 | A | 0.65 | 0.62 | 0.38 | 0.39 | 0.49 | B | 0.43 | 0.58 | | |
| | Flat Sheet Bottom Ply | C/D | 0.58 | 0.59 | 0.40 | 0.37 | 0.47 | C | 0.47 | 0.50 | 0.29 | 0.27 | 0.37 | D | 0.42 | 0.54 | | |
| FIG. 19/FIG. 5 Current Invention | Tissue 8 | A/D | 0.36 | 0.48 | 0.26 | 0.24 | 0.32 | A | 0.33 | 0.32 | 0.37 | 0.31 | 0.33 | D | 0.33 | 0.34 | 18.9 | 654 |
| | Embossed Top Ply | A/B | 0.35 | 0.32 | 0.32 | 0.30 | 0.32 | A | 0.62 | 0.56 | 0.50 | 0.45 | 0.53 | B | 0.43 | 0.70 | | |
| | Flat Sheet Bottom Ply | C/D | 0.35 | 0.33 | 0.33 | 0.33 | 0.33 | C | 0.29 | 0.31 | 0.23 | 0.22 | 0.26 | D | 0.30 | 0.38 | | |
| FIG. 17/FIG. 5 Current Invention | Tissue 9 | A/D | 0.39 | 0.50 | 0.43 | 0.43 | 0.44 | A | 0.46 | 0.48 | 0.34 | 0.33 | 0.40 | D | 0.42 | 0.46 | 22.6 | 572 |
| | Embossed Top Ply | A/B | 0.59 | 0.53 | 0.57 | 0.54 | 0.56 | A | 0.79 | 0.72 | 0.84 | 0.73 | 0.77 | B | 0.66 | 0.92 | | |
| | Flat Sheet Bottom Ply | C/D | 0.57 | 0.59 | 0.30 | 0.30 | 0.42 | C | 0.49 | 0.49 | 0.24 | 0.25 | 0.34 | D | 0.38 | 0.46 | | |
| FIG. 3 Prior Art - CWP Premium | Tissue 10 | A/D | 0.91 | 0.60 | 0.48 | 0.36 | 0.55 | A | 1.02 | 0.92 | 0.82 | 0.59 | 0.82 | D | 0.69 | 1.02 | 16.7 | 582 |
| | Embossed Top Ply | A/B | 0.62 | 0.57 | 0.53 | 0.40 | 0.52 | A | 0.76 | 0.68 | 0.79 | 0.57 | 0.69 | B | 0.61 | 0.81 | | |
| | Embossed Bottom Ply | C/D | 0.70 | 0.55 | 0.46 | 0.34 | 0.50 | C | 0.71 | 0.61 | 0.55 | 0.38 | 0.55 | D | 0.52 | 0.58 | | |
| FIG. 3 Prior Art - CWP Economy | Tissue 11 | A/D | 1.00 | 0.85 | 1.39 | 0.85 | 1.01 | A | 0.79 | 0.80 | 1.23 | 0.64 | 0.85 | D | 0.93 | 1.10 | 25.7 | 836 |
| | Embossed Top Ply | A/B | 0.95 | 0.64 | 0.69 | 0.48 | 0.67 | A | 0.69 | 0.58 | 1.10 | 0.71 | 0.75 | B | 0.71 | 0.80 | | |
| | Embossed Bottom Ply | C/D | 0.71 | 0.60 | 1.17 | 0.75 | 0.78 | C | 0.73 | 0.67 | 0.75 | 0.53 | 0.67 | D | 0.72 | 0.85 | | |

TABLE 25-continued

| | | | | | | | | | | | | | | | | | | | |
|---|---|---|---|---|---|---|---|---|---|---|---|---|---|---|---|---|---|---|---|
| Prior Art - French High Strength | Tissue 12 | | A/D | 0.49 | 0.48 | 0.38 | 0.32 | 0.40 | A | 0.50 | 0.48 | 0.37 | 0.37 | 0.42 | D | 0.41 | 0.44 | 27.0 | 961 |
| | | Embossed Top Ply | A/B | 0.59 | 0.59 | 0.35 | 0.36 | 0.46 | A | 0.64 | 0.69 | 0.73 | 0.92 | 0.74 | B | 0.60 | 0.97 | | |
| | | Flat Sheet Bottom Ply | C/D | 0.60 | 0.62 | 0.47 | 0.42 | 0.52 | C | 0.45 | 0.45 | 0.29 | 0.31 | 0.37 | D | 0.44 | 0.63 | | |
| Prior Art - French High Strength | Tissue 13 | | A/D | 0.41 | 0.38 | 0.39 | 0.29 | 0.37 | A | 0.47 | 0.45 | 0.54 | 0.57 | 0.51 | D | 0.44 | 0.60 | 30.8 | 1110 |
| | | Embossed Top Ply | A/B | 0.65 | 0.66 | 0.40 | 0.36 | 0.50 | A | 0.61 | 0.55 | 0.95 | 1.10 | 0.77 | B | 0.64 | 0.98 | | |
| | | Flat Sheet Bottom Ply | C/D | 0.56 | 0.52 | 0.53 | 0.48 | 0.52 | C | 0.44 | 0.39 | 0.22 | 0.26 | 0.31 | D | 0.42 | 0.70 | | |
| Prior Art - Greece High Strength | Tissue 14 | | A/D | 0.49 | 0.46 | 0.36 | 0.31 | 0.40 | A | 0.53 | 0.51 | 0.38 | 0.42 | 0.45 | D | 0.43 | 0.49 | 32.6 | 928 |
| | | Embossed Top Ply | A/B | 0.37 | 0.35 | 0.40 | 0.40 | 0.38 | A | 1.09 | 1.03 | 0.66 | 0.84 | 0.56 | B | 0.63 | 1.49 | | |
| | | Flat Sheet Bottom Ply | C/D | 0.57 | 0.56 | 0.59 | 0.38 | 0.52 | C | 0.84 | 0.86 | 0.33 | 0.37 | 0.54 | D | 0.53 | 0.55 | | |
| Prior Art - Premium Club | Tissue 15 | | A/D | 0.52 | 0.44 | 0.40 | 0.34 | 0.42 | A | 0.73 | 0.65 | 0.44 | 0.60 | 0.59 | D | 0.51 | 0.72 | 17.4 | 712 |
| | | Embossed Top Ply | A/B | 0.75 | 0.72 | 0.45 | 0.29 | 0.51 | A | 0.57 | 0.54 | 0.42 | 0.54 | 0.52 | | 0.52 | 0.52 | | |
| | | Embossed Bottom Ply | C/D | 0.73 | 0.71 | 0.50 | 0.38 | 0.56 | C | 0.55 | 0.44 | 0.42 | 0.65 | 0.51 | | 0.53 | 0.59 | | |
| Prior Art - CWP Super Premium | Tissue 16 | | A/D | 0.57 | 0.49 | 0.53 | 0.39 | 0.49 | A | 0.59 | 0.51 | 0.40 | 0.53 | 0.50 | D | 0.50 | 0.51 | 14.0 | 570 |
| | | Embossed Top Ply | A/B | 0.72 | 0.70 | 0.38 | 0.33 | 0.50 | A | 0.59 | 0.54 | 0.42 | 0.56 | 0.52 | B | 0.51 | 0.54 | | |
| | | Embossed Bottom Ply | C/D | 0.60 | 0.59 | 0.47 | 0.39 | 0.51 | C | 0.54 | 0.46 | 0.36 | 0.37 | 0.43 | D | 0.47 | 0.56 | | |

Surface A    Top Ply    Surface A    Multi-Ply Structure
Surface B    = = =>    Surface D
Surface C    Bottom Ply
Surface D

We claim:

1. A multi-ply tissue product formed by marrying a first embossed ply with a second ply, said first embossed ply having a TMI sidedness of at least about 0.45 and an embossed area of at least about 2%, wherein the multi-ply tissue product exhibits an overall TMI sidedness of less than about 0.6 and a geometric mean tensile strength of less than about 800 g/3".

2. The product of claim 1, wherein the TMI sidedness of the second ply differs from that of the first by at least about 0.1.

3. The product of claim 1, wherein the TMI sidedness of the second ply differs from that of the first by at least about 0.15.

4. The product of claim 1, wherein the geometric mean tensile modulus of the multi-ply tissue product is less than about 27.

5. The product of claim 1, wherein the geometric mean tensile modulus of the multi-ply tissue product is less than about 25.

6. The product of claim 1, wherein the TMI geometric mean friction deviation of the multi-ply tissue product is less than about 0.6.

7. The product of claim 1, wherein the TMI geometric mean friction deviation of the multi-ply tissue product is less than about 0.55.

8. The product of claim 1, further comprising a GM tensile strength of from about 21 g to about 35 g/3" width per lb. of basis weight.

9. The product of claim 1, further comprising a caliper of at least about 2 mils/8 plies/lb. basis weight.

10. The product of claim 1, further comprising a tensile stiffness of less than about 2 g/inch/% strain per lb. of basis weight.

11. The product of claim 1, wherein at least one ply has a TMI sidedness of less than about 0.6.

12. The product of claim 1, wherein said second ply is embossed.

13. The product of claim 1, wherein neither outer surface of said multi-ply tissue has protrusions resulting from said emboss.

14. The product of claim 1, wherein said multi-ply tissue is formed from a CWP process.

15. The product of claim 1, wherein said multi-ply tissue is formed from a TAD process.

16. A multi-ply tissue product formed by marrying a first embossed ply with a second ply, said first embossed ply having a TMI sidedness of at least about 0.45 and an embossed area of at least about 2%, wherein the multi-ply tissue product exhibits an overall TMI sidedness of less than about 0.6 and a geometric mean tensile strength of less than about 35 g/3" per lb. of basis weight.

17. The product of claim 16, wherein the TMI sidedness of the second ply differs from that of the first by at least about 0.1.

18. The product of claim 16, wherein the TMI sidedness of the second ply differs from that of the first by at least about 0.15.

19. The product of claim 16, wherein the geometric mean tensile modulus of the multi-ply tissue product is less than about 27.

20. The product of claim 16, wherein the geometric mean tensile modulus of the multi-ply tissue product is less than about 25.

21. The product of claim 16, wherein the TMI geometric mean friction deviation of the multi-ply tissue product is less than about 0.6.

22. The product of claim 16, wherein the TMI geometric mean friction deviation of the multi-ply tissue product is less than about 0.55.

23. The product of claim 16, further comprising a GM tensile strength of from about 21 g to about 35 g/3" width per lb. of basis weight.

24. The product of claim 16, further comprising a caliper of at least about 2 mils/8 plies/lb. basis weight.

25. The product of claim 16, further comprising a tensile stiffness of less than about 2 g/inch/% strain per lb. of basis weight.

26. The product of claim 16, wherein at least one ply has a TMI sidedness of less than about 0.6.

27. The product of claim 16, wherein said second ply is embossed.

28. The product of claim 16, wherein neither outer surface of said multi-ply tissue has protrusions resulting from said emboss.

29. The product of claim 16, wherein said multi-ply tissue is formed from a CWP process.

30. The product of claim 16, wherein said multi-ply tissue is formed from a TAD process.

31. The product of claim 1, wherein said multi-ply tissue comprises more then two piles.

32. The product of claim 16, wherein said multi-ply tissue comprises more than two plies.

33. The product of claim 1, wherein the embossed area of the first ply is at least about 4%.

34. The product of claim 1, wherein the embossed area of the first ply is at least about 8%.

35. The product of claim 16, wherein the embossed area of the first ply is at least about 4%.

36. The product of claim 16, wherein the embossed area of the first ply is at least about 8%.

* * * * *